United States Patent [19]

Elwakil

[11] Patent Number: 5,574,078
[45] Date of Patent: Nov. 12, 1996

[54] THERMAL COMPOSITIONS

[75] Inventor: Hamdy A. Elwakil, Chanhassen, Minn.

[73] Assignee: Lasermaster Corporation, Eden Prairie, Minn.

[21] Appl. No.: 337,295

[22] Filed: Nov. 10, 1994

[51] Int. Cl.⁶ .................. C09D 5/00; C09D 11/00
[52] U.S. Cl. .................. 523/161; 524/275; 524/277; 524/423; 524/430; 524/445
[58] Field of Search ................ 523/161; 524/275, 524/277, 423, 430, 445

[56] References Cited

U.S. PATENT DOCUMENTS

| | | | |
|---|---|---|---|
| 4,118,361 | 10/1978 | Lundberg | 260/31.8 |
| 4,155,314 | 5/1979 | O'Callaghan et al. | 111/1 |
| 4,308,542 | 12/1981 | Maekawa et al. | 346/1.1 |
| 4,390,369 | 6/1983 | Merritt et al. | 106/31 |
| 4,500,896 | 2/1985 | Kubo et al. | 346/204 |
| 4,603,172 | 7/1986 | Albee et al. | 525/143 |
| 4,613,644 | 9/1986 | Moritani et al. | 524/430 |
| 4,636,258 | 1/1987 | Hayashi et al. | 106/31 |
| 4,741,930 | 5/1988 | Howard et al. | 427/265 |
| 4,752,298 | 6/1988 | Burglin et al. | 8/527 |
| 4,808,227 | 2/1989 | Yuasa et al. | 106/31 |
| 4,818,591 | 4/1989 | Kitamura et al. | 428/216 |
| 4,853,706 | 8/1989 | Van Brimer et al. | 346/1.1 |
| 4,889,761 | 12/1989 | Titterington et al. | 428/195 |
| 4,927,693 | 5/1990 | Koshizuka et al. | 428/141 |
| 4,950,701 | 8/1990 | Okamura et al. | 524/237 |
| 4,954,395 | 9/1990 | Hasegawa et al. | 428/318.4 |
| 4,970,119 | 11/1990 | Koshizuka et al. | 428/411.1 |
| 5,053,079 | 10/1991 | Haxell et al. | 106/31 |
| 5,071,502 | 12/1991 | Hashimoto et al. | 156/234 |
| 5,077,169 | 12/1991 | Inoue et al. | 430/110 |
| 5,084,099 | 1/1992 | Jaegar et al. | 106/22 |
| 5,084,330 | 1/1992 | Koshizuka et al. | 428/212 |
| 5,102,458 | 4/1992 | Lent et al. | 106/20 |
| 5,122,187 | 6/1992 | Schwarz et al. | 106/25 |
| 5,122,188 | 6/1992 | Erhan et al. | 106/28 |
| 5,124,719 | 6/1992 | Matsuzaki | 346/1.1 |
| 5,130,372 | 7/1992 | Lences et al. | 525/183 |
| 5,134,033 | 7/1992 | Umise et al. | 428/411.1 |
| 5,141,559 | 8/1992 | Shinozuka et al. | 106/27 |
| 5,151,120 | 9/1992 | You et al. | 106/27 |
| 5,159,035 | 10/1992 | Evani | 526/240 |
| 5,182,572 | 1/1993 | Merritt et al. | 346/1.1 |
| 5,185,035 | 2/1993 | Brown et al. | 106/31 R |
| 5,196,475 | 3/1993 | Lences et al. | 524/514 |
| 5,215,810 | 6/1993 | Koshizuka et al. | 428/195 |
| 5,219,610 | 6/1993 | Koshizuka et al. | 427/152 |
| 5,221,335 | 6/1993 | Williams et al. | 106/23 A |
| 5,259,873 | 11/1993 | Fujioka | 106/20 C |
| 5,262,471 | 11/1993 | Akso | 524/496 |
| 5,286,288 | 2/1994 | Tobias et al. | 106/20 B |
| 5,298,062 | 3/1994 | Davies et al. | 106/20 R |
| 5,314,778 | 5/1994 | Smith et al. | 430/111 |
| 5,421,873 | 6/1995 | Arimura et al. | 106/31 R |
| 5,434,030 | 7/1995 | Smith et al. | 430/106 |

FOREIGN PATENT DOCUMENTS

| | | |
|---|---|---|
| 0565735A1 | 10/1993 | European Pat. Off. . |
| 0610090A1 | 8/1994 | European Pat. Off. . |
| WO94/04619 | 3/1994 | WIPO . |

OTHER PUBLICATIONS

Billmeyer, Fred W. Jr.; *Textbook of Polymer Science*; p. 370; John Wiley & Sons, Inc. (3rd Ed. 1984).
Bennett, H.; *Industrial Waxes*; vol. 1; page ix; Chemical Publishing Co. Inc. (1975).
Krutzel, Lawrence; *ACLyn® Low Molecular Weight Ionomers For Hot Melt Adhesives*; Reprint of a paper presented at the Adhesive & Sealant Council Fall Seminar, Oct., 1987.
Allied–Signal Inc. brochure: *ACLyn® Low Molecular Weight Ionomers* (1990).

Primary Examiner—Paul R. Michl
Assistant Examiner—U. K. Rajguru
Attorney, Agent, or Firm—Phil Fox, Esq.; Kinney & Lange

[57] ABSTRACT

A hot melt composition that comprises a color concentrate and a base component, the color concentrate comprising a colorant, and a hot melt ink concentrate that comprises a colorant, a non-wax colorant blend agent, and a resin.

65 Claims, 1 Drawing Sheet

THERMAL COMPOSITIONS

BACKGROUND OF THE INVENTION

The present invention generally relates to concentrates and to colored compositions, such as thermal compositions. More particularly, the present invention relates to color concentrates and to hot melt compositions, such as hot melt inks and thermal printing mediums. Additionally, the present invention relates to various methods of making color concentrates thermal compositions, such as color concentrates hot melt compositions, and to a method of increasing colorant concentration in thermal components and compositions.

Ink jet printers have benefitted from various technical breakthroughs to become increasingly reliable and productive. Advances in speed, response, and print definition and clarity are examples of just a few of the many advances in ink jet printers. Advances in ink technology must occur to fully reap the benefits of the improved ink jet printers. Improvements to operational and rheological characteristics of inks used in ink jet printers are envisioned. For example, ink improvements that enhance ink flow through ink jet printers are needed. Additionally, advances that enhance colorant concentrations and colorant uniformity in the inks are desirable. Improved interaction between inks and substrates the inks are applied to is also needed.

Inks typically include at least a colorant and a colorant transport vehicle. Polymeric resins generally make good transport vehicles for colorants such as pigments and dyes. Additionally, polymeric resins offer good operational properties including thermal stability. However, ink compositions that are made of polymeric resins sometimes require modification to enhance performance of the compositions during certain operations. For example, the viscosity of inks that are made of polymeric resins is typically above the viscosity range that is desirable for good ink jet printer operation.

One alternative to polymeric resins as colorant transport vehicles is wax, including wax-like materials. Waxes have a relatively low viscosity, as compared to polymeric resins. Thus, wax-based inks might be expected to improve ink jet operation. However, aside from the lower viscosity, operational properties of wax-based inks are less than desirable. For example, the wax base of the wax-based inks does not typically solubilize dyes or disperse pigments well. Also, wax-based inks do not adhere well to many substrates, such as paper, and can be relatively easily abraded from the substrates. Additionally, though waxes are somewhat transparent in the liquid state, waxes are typically highly crystalline. Therefore, wax-based inks are typically not very transparent in the solid state.

Another option for reducing ink viscosity and improving ink jet operation is to combine wax with polymeric resin in forming ink compositions. However, though waxes can be added to polymeric resins to reduce ink viscosities, dye solubility and pigment dispersibility are each limited in ink compositions that include polymeric resin and wax, as compared to ink compositions that include polymeric resin but not wax. Additionally, wax that is added to polymeric resin diminishes ink adherence to substrates such as paper. Furthermore, the scuff resistance of existing inks that include combinations of wax and polymeric resin, as well as, the jet-ability of such inks also suffer. Jetability relates to various operational considerations and characteristics, such as uniformity of flow in the liquid state, nozzle-clogging characteristics, surface tension, droplet size, and the shape of ink droplets after application to substrates.

Nonetheless, examples of ink and thermal compositions that include wax, polymeric resins, or combinations of waxes and polymeric resins do exist. For example, U.S. Pat. No. 4,390,369 to Merritt et al. discloses wax-based ink formulations for discharge at temperatures above ambient from an ink jet apparatus. Ink formulations prepared according to Merritt are said to provide good ink dot circularity that produces characters approaching and surpassing typewriter quality printing.

U.S. Pat. No. 4,500,896 to Kubo et al. concerns an image transfer-type, heat-sensitive recording medium. Kubo details a solid ink that contains a fusible substance and a coloring agent dispersed in the fusible substance. Examples of suitable fusible substances include various waxes and polymeric substances.

U.S. Pat. No. 4,603,172 to Albee et al. relates to polymer dispersion aids that are made from polymer salts of low molecular weight, copolymers of alpha-olefins and alpha, beta-ethylenically unsaturated carboxylic acid. Albee addresses use of the described compounds in dispersing finely divided inert materials and polymers and also describes a method of processing polymers to maximize material dispersion.

U.S. Pat. No. 4,636,258 to Hayashi et al. concerns an ink composition for thermal transfer printing that includes a copolymer, a colorant, wax, and suitable resins. The described ink composition is stated to be suitable for use as the ink layer of an electro-thermal transfer recording sheet.

U.S. Pat. No. 4,808,227 to Yuasa et al. describes a semi-solid ink for a heat transfer recording method. The semi-solid ink includes a heat-fusible binder, such as a combination of a wax and a naphthenic hydrocarbon, and may also incorporate a softening agent and a colorant.

U.S. Pat. No. 4,818,591 to Kitamura addresses a thermal transfer recording medium that includes an aqueous emulsion portion having a heat fusible layer and at least one aqueous emulsion colorant layer. Waxes are examples of compounds included in the heat-fusible layer. Various oils and polymeric resins are mentioned as possible components of the colorant layer.

U.S. Pat. No. 4,927,693 to Koshizuka also addresses a thermal transfer recording medium that includes a fusible colorant layer. The fusible colorant layer may include fusible materials, such as waxes, and also may contain polymeric resins.

U.S. Pat. No. 4,970,119 to Koshizuka describes a thermal transfer recording medium with a peel layer and a heat-softening layer. The peel layer may contain a wax and a polymer resin and may also contain a coloring material. The heat softening layer may also contain a wax and a polymeric resin and, optionally, may include a coloring material.

U.S. Pat. No. 5,071,502 to Hashimoto et al. discloses a heat sensitive recording material that includes a hot-melt heat-sensitive ink material. The heat-sensitive ink material comprises an amorphous polymer and a coloring material. The heat-sensitive ink material is coated on a support by solution coating or by hot melt coating.

U.S. Pat. No. 5,124,719 to Matsuzaki discloses an ink composition that includes first and second components and a coloring material. The coloring material dissolves in the second component, but does not dissolve in the first component. The first component and the second component have different melting points such that when the ink contacts recording paper, the first component permeates into the recording paper and the second component, containing all of the colorant, remains on the surface of the recording paper.

U.S. Pat. No. 5,134,033 to Umise et al. discloses a thermal transfer sheet that includes a heat-fusible ink layer. The heat-fusible ink layer includes carbon black, a vehicle, and an optional additive. The vehicle may include a wax or a mixture of a wax and another component, such as drying oil, resin, mineral oil, and derivatives of cellulose and rubber.

U.S. Pat. No. 5,141,559 to Shinozuka discloses an ink composition that includes a carrier vehicle for transporting a coloring material. The vehicle includes at least one high molecular weight alkyl amine, at least one high molecular weight fatty acid, and carnauba wax. The coloring material is a metallic complex-type solvent dye.

U.S. Pat. No. 5,151,120 to You et al. discloses an ink jet composition that includes a carrier, a driver, and a colorant. Suitable carriers include waxes, plastics, polymers and oligomers.

U.S. Pat. No. 5,182,572 to Merritt et al. discloses an ink composition that includes a vehicle and a coloring agent. The vehicle may include fatty acids and waxes, such as natural waxes, synthetic substances, resins, and meltable polymeric materials.

U.S. Pat. No. 5,196,475 to Lences discloses a pigment composition. The pigment composition may include salts of certain low molecular weight copolymers, pigment, and a first polymer. The first polymer may be polyamide, polyolefin, polyester, polycarbonate and phenolic resin.

U.S. Pat. No. 5,215,810 to Koshizuka relates to a thermal transfer recording medium that includes a plurality of heat softening colorant layers. The heat softening colorant layers contain a colorant, a thermofusible substance, and a thermoplastic substance. Examples of the thermofusible substance includes various waxes, higher fatty acids, higher alcohols, esters of higher fatty acids, amides, and higher amines. Examples of the thermoplastic resin include certain copolymers, elastomers, polymeric resins and rosin derivatives.

U.S. Pat. No. 5,221,335 to Williams et al. discloses pigmented hot melt inks that include colored pigments and a vehicle. The vehicle may include any suitable hydrocarbon polymer or wax-like material, certain fatty acids, or ketones of certain fatty acids.

U.S. Pat. No. 5,262,471 to Akao discloses a resin composition which comprises a modified polyolefin resin and carbon black and which may optionally include thermoplastic resins and polyolefin wax. The modified polyolefin resin is a polyolefin resin modified by an unsaturated carboxylic acid, or a derivative thereof.

U.S. Pat. No. 5,286,288 to Tobias discloses a hot melt ink composition that comprises an electrolyte and an electrolyte-solvating and dissociating compound selected from the group consisting of alkanolamides and polyethylene glycol. The ink may also include a viscosity reducing agent, a hardening agent, and a flexibilizing agent.

SUMMARY OF THE INVENTION

The present invention includes a hot melt composition that comprises a color concentrate and a base component, with the color concentrate comprising a colorant. The present invention also includes a hot melt ink concentrate that comprises a colorant, a non-wax colorant blend agent, and a resin. The present invention further includes an ink concentrate, an ink composition for ink jet recording on a recording medium at temperatures higher than room temperature, a method of making a hot melt composition, a method of making a hot melt ink concentrate, a method of making a color concentrate, a method of making an ink composition, a method of increasing colorant concentration in a hot melt composition, and a method of enhancing the concentration of a colorant attainable in a wax.

DETAILED DESCRIPTION OF THE PREFERRED EMBODIMENTS

Figure 1:
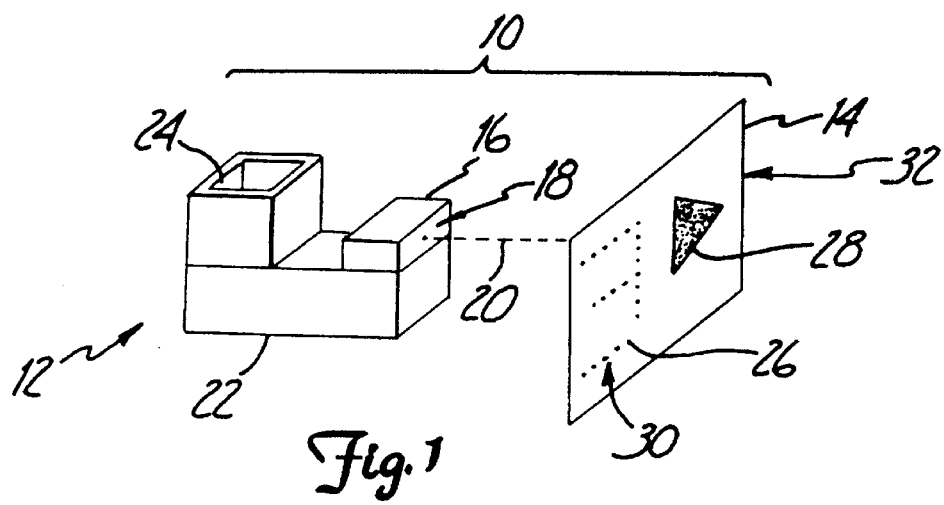
FIG. 1 is a schematic view of a printing system for applying the hot melt ink of the present invention to a substrate.

A color concentrate of the present invention, such as a thermoplastic ink concentrate, includes a resinous component, a colorant, and, optionally, a first colorant blend agent. The inventive color concentrate preferably also includes an antioxidant. A colored composition of the present invention includes a first portion, such as the color concentrate, and also includes a second portion. The colored composition may be a thermal composition, such as a hot melt composition. The hot melt composition may be a phase change ink, such as a hot melt ink for an ink jet printer. Additionally, the color concentrate and the colored composition of the present invention may be incorporated into a thermal printing or recording composition, medium, article, device, or method.

The colorant of the color concentrate may be one or more dyes, one or more pigments, or a combination of one or more dyes and one or more pigments. Dyes and pigments typically include ionic functional groups and therefore tend to be somewhat polar in nature. The resinous component is therefore also relatively polar in nature to enhance dye solubility and pigment dispersion in the color concentrate.

It has been discovered that the first colorant blend agent aids in obtaining and maintaining homogenous mixture of the resinous component and the colorant. The first colorant blend agent has also been found to increase the rate and ease of solubilizing the dye in the resinous component and to increase the rate and ease of dispersing the pigment in the resinous component. Therefore, the first colorant blend agent effectively acts as a dye solubilizer and as a pigment dispersant. Surprisingly, the first colorant blend agent also increases the concentration of the colorant, such as the dye or pigment, that is attainable in the color concentrate.

It is to be understood that all concentrations herein are expressed in weight percent, unless otherwise stated. Additionally, all amounts are expressed on a weight basis, unless otherwise stated. The resinous component may form from about 40% to about 100% of the color concentrate. The first colorant blend agent may be present in the color concentrate in an effective amount of from 0% to about 30%. Where the colorant is the dye, the colorant is present in the color concentrate in an effective amount of from about 0.1% to about 40%. Where the colorant is a pigment, the colorant is present in the color concentrate in an effective amount of from about 0.1% to about 40%.

Preferably, to minimize the cost of the color concentrate while maintaining good operational and performance characteristics, the concentration of the resinous component in the color concentrate is from about 60% to about 95%. When included in the color concentrate, the preferred concentration of the first colorant blend agent in the color concentrate is from about 0.5% to about 20%. The preferred dye concentration in the color concentrate is from about 0.5% to about 35% and the preferred pigment concentration in the color concentrate is from about 1% to about 10%. More preferably, to further minimize the cost of the color concentrate while retaining good operational and performance characteristics, the concentration of the resinous component in the color concentrate is from about 60% to about 80% and the concentration of the first colorant blend agent, when included, is from about 1% to about 5% of the color concentrate. Similarly, the more preferred concentration of dye in the color concentrate is from about 15% to about 25%, and the more preferred concentration of pigment in the color concentrate is from about 1% to about 5%.

Examples of suitable materials for the resinous component include polyamides; polyurethane resins; polycarbonate resins; polyester resins; epoxy resins; ionomer resins; polyvinyl alcohol resins; polyols; polyvinyl chloride resins; polyvinylidene-based chloride resins; polyvinyl acetate resins; polyvinyl pyridine esters; polysulfonamides; polyvinyl pyrolidone/polyvinyl acetate copolymers; polyvinyl pyrolidone copolymers; p-toluene sulfonamide; dimer acid amides; tetra-amides, such as dimer-acid based tetra-amides; silicon resins; phenolic resins; rosin-modified phenolic resins; and rosin-modified maleic acid resins. The resinous component may comprise any one or a compatible combination of one or more of the aforementioned suitable materials, keeping in mind that the resinous component should be compatible with other ingredients of the color concentrate and with ingredients of the colored composition.

Examples of suitable polyamide resins include various Versamid® resins, including Versamid® 335, Versamid® 744, Versamid® 750, Versamid® 753, Versamid® 754, Versamid® 756, Versamid® 757, Versamid® 759, Versamid® 900, Versamid® 930, Versamid® 940, Versamid® 943, Versamid® 957, Versamid® 963, Versamid® 972, Versamid® 973, and Versamid® 1655 resins, all available from Henkel Corp. of Hoboken, N.J.; various Azamide® resins, including Azamide® 1912, Azamide® 1930, Azamide® 1931, Azamide® 1940, Azamide® 1956, Azamide® 1965, Azamide® 2201, Azamide® 2233, Azamide® 2237. Azamide® 2240, Azamide® 2243, Azamide® 2246, Azamide® 2246LV, and Azamide® 2462 resins, all available from Shell Chemical Co. of Houston, Tex.; Unirez® 1548, Unirez® 1549, Unirez® 2209, Unirez® 2215, Unirez® 2218, various Unirez® resins including Unirez® 2221, Unirez® 2224, Unirez® 2226, and Unirez® 2228 resins, all available from Union Camp Corp. of Jacksonville, Fla.; polycapramide (nylon-6); poly-ω-aminoheptane acid (nylon-7); poly-ω-aminononane acid (nylon-9); polyundecaneamide (nylon-11); polylauric lactam (nylon-12); polyethylenediamine adipamide (nylon-2,6); polytetramethylene adipamide (nylon-4,6); polyhexamethylene adipamide (nylon-6,6); polyhexamethylene sebacamide (nylon-6,10); polyhexamethylene dodecamide (nylon-6,12); polyoctamethylene adipamide (nylon-8,6); polydecamethylene adipamide (nylon-10,6); polydodecamethylene sebacamide (nylon-10,8); caprolactam-lauric lactam copolymer; caprolactam-hexamethylene diammonium adipate copolymers; lauric lactam-hexamethylene diammonium adipate copolymer; hexamethylene diammonium adipate-hexamethylene diammonium sebacate copolymer; ethylene diammonium adipate-hexamethylene diammonium adipate copolymer; and caprolactam-hexamethylene diammonium adipate-hexamethylene diammonium sebacate copolymer.

Preferred examples of the polyamide resins include the Versamid® 759 resin, the Azamide® 1912 resin, the Azamide® 2462 resin, and the Unirez® 2224 resin. These examples of the polyamide resins are preferred because they each have relatively low viscosities useful in attaining the viscosity range needed for the colored composition to perform acceptably as the hot melt ink in ink jet printers.

Examples of suitable polyester resins include poly(ethylene terephthalate), poly(butylene terephthalate), poly(ethylene terephthalateisophthalate), and poly(ethylene glycol-cyclohexanedimethanol-terephthalate). They may contain as a comonomer component a diol (e.g., ethylene glycol, butylene, glycol, cyclohexanedimethanol, neopentyl glycol, and pentane diol) or a dicarboxylic acid (e.g., isophthalic acid, benzophenone dicarboxylic acid, diphenylsulfone dicarboxylic acid, diphenyhnethane dicarboxylic acid, propylene bis(phenylcarboxylic acid), diphenyloxide dicarboxylic acid, oxalic acid, malonic acid, succinic acid, glutaric acid, adipic acid, pimelic acid, suberic acid, azelaic acid, sebacic acid, and diethyl succinic acid).

Examples of suitable polyvinyl chloride resins include homopolymers of vinyl chloride and copolymers of vinyl chloride with vinyl acetate, maleic acid derivative, or higher alkylvinyl ether.

Examples of suitable polystyrene resins include styrene homopolymer, butadiene-grafted polystyrene copolymer, polystyrene-butadiene rubber blend, and styrene maleic anhydride copolymer.

Suitable colorants in the color concentrate include inorganic and organic pigments and various dyes, including acid dyes, direct dyes, disperse dyes, oil soluble dyes, metal-complex oil soluble dyes and solvent dyes. Dyes are preferred over pigments, though any dye or pigment may be chosen, provided that it is capable of being dissolved or dispersed in the color concentrate and in the colored composition and is compatible with the other ingredients of the color concentrate and the colored composition.

Examples of suitable dyes include Pontamine; Food Black 2; Neopen Yellow 075 dye and the following Orasol® dyes: Black RLI, Black CN, Yellow 4GN, Yellow 3R, Yellow 2GLN, Orange G, Orange RLN, Red 3GL, Red BL, Red G, Yellow 2RLN, Blue GN, Blue GL, Cyan GN, Pink 5BLG, Violet RN, Brown 2GL, Brown 2RL, and Brown 6RL, each available from Ciba-Geigy of Ardsley, N.J.; Carodirect Turquoise FBL Supra Conc. (Direct Blue 199) and Carodirect Yellow RIYAL (Direct Yellow 86), each available from Carolina Color Corp. of Salisbury, N.C.; Special Fast Turquoise 8GL Liquid (Direct Blue 86), Levafix Brilliant Red E-4B, and Levafix Brilliant Red E6BA, each available from Mobay Chemical Corp. of Pittsburgh, Pa.; Intrabond Liquid Turquoise GLL (Direct Blue 86) and Direct Brill Pink B Ground Crude, each available from Crompton & Knowlos; Cibracron Brilliant Red 38-A (Reactive Red 4), available from Aldrich Chemical Co. of Milwaukee, Wis.; Pylakrome Dark Magenta LX 10032, Drimarene Brilliant Red X-2B (Reactive Red 56), and Pylam Certified D&C Red #28 (Acid Red 92), each available from Pylam Products, Inc. of Garden City, N.Y.; Procion Red H8B (Reactive Red 31), available from ICI Americas of Wilmington, Del.; Cartasol Yellow GTF Presscake, Tartrazine Extra Conc. (FD&C Yellow #5, Acid Yellow 23), Cartasol Yellow GTF Liquid Special 110 and Carta Black 2GT, each available from Sandoz Colors and Chemicals of East Hanover, N.J.; D&C Yellow #10 (Acid Yellow 3) and Yellow Shade 16948, each available from Tricon; and Basacid Black X34, Thermoplast Yellow, and Neopen Yellow 075 dye, each available from BASF Wyandotte Corp. of Wyandotte, Mich.

Examples of suitable pigments include titanium dioxide; carbon black; zinc oxide; pression blue; cadimum sulfide; iron oxide; chromates of lead, zinc, barium, and calcium; azo; thioindigo; anthraquinone; anthoanthrone; triphenonedioxazine; fat dye pigments; phthalocyanine pigments, such as copper phthalocyanine pigment and its derivatives; quinacridon pigment; Violet Toner VT-8015, Normandy Magenta RD-2400, Permanent Violet VT2645, Argyle Green XP-111-S, Brilliant Green Toner GR 0991, Lithol Rubine Toner, Royal Brilliant Red RD-8192, Ortho Orange OR 2673, and Permanent Yellow YE 0305, each available from Paul Uhlich & Co., Inc. of Hastings-on-Hudson, N.Y.; Paliogen Violet 5100, Paliogen Violet 5890, Heliogen Green L8730, Lithol Scarlet D3700, Lithol Scarlet 4440, Paliogen Red 3871K, Paliogen Red 3340, Lithol Fast Scarlet L4300, Heliogen Blue L6900, Heliogen Blue L7020, Heliogen Blue K6902, Heliogen Blue K6910, Heliogen Blue D6840, Heliogen Blue D7080, Sudan Blue OS, Neopen Blue FF4012, Paliogen Blue 6470, Sudan Orange 220, Paliogen Orange 3040, Paliogen Yellow 1560, Lithol Fast Yellow 0991K, Paliotol Yellow 1840, Lumogen Yellow D0790, Suco-Gelb L1250, Suco-Yellow D1355, Sico Fast Yellow D1355, Sico Fast Yellow D1351, Fanal Pink D4830, Paliogen Black L0084, and Pigment Black K801, each available from BASF Wyandotte Corp.; Tolidine Red, E. D. Toluidine Red, and Sudan Orange G, each available from Alrich; Scarlet for Thermoplast NSD PS PA, available from Ugine Kuhlmann of Canada; Bon Red C, available from Dominion Color Co.; Oracet Pink RF and Iragalite Blue BCA, each available from Ciba-Geigy; Novoperm Yellow FGL, Hostaperm Pink E, and PV Fast Blue B2G01, each available from American Hoechst; Cinquasia Magenta, available from E.I. DuPont de Nemours of Wilmington, Del.; and carbon blacks such as Regal® 330 and Regal® 350R, available from Cabot Corp. of Boston, Mass.; and Carbon Black 5250 and Carbon Black 5750, each available from Columbian Chemicals Co. of Atlanta, Ga.

The colorant may comprise any one or a compatible combination of one or more of the aforementioned dye and pigments, keeping in mind that the colorant should be compatible with other ingredients of the color concentrate and with ingredients of the colored composition.

The first colorant blend agent may be an ionomer. The definition of "ionomer" is provided in *Textbook of Polymer Science,* page 370 (3rd ed.1984), by Fred W. Billmeyer, Jr. An ionomer is a thermoplastic containing ionizable carboxyl groups capable of creating ionic crosslinks between chains. More specifically, an ionomer is a partially neutralized copolymer of an α-olefin and a carboxylic acid monomer. The copolymer is partially neutralized with a metal cation. The first colorant blend agent, such as the ionomer, should be soluble in the resinous component of the color concentrate when the first colorant blend agent and/or the resinous component are in the molten state. Preferably, the first colorant blend agent solubilizes in the resinous component quickly, within about 5 minutes at a resinous component/ionomer ratio of from about 40:1 to about 0.9:1 on a weight basis, when the first colorant blend agent and/or the resinous component are in the molten state.

The ionomer, in the molten state, may have any viscosity and acid number so long as the molten ionomer is soluble in the resinous component and in other ingredients of the color concentrate and the second portion, when the resinous component and the other ingredients are in the liquid state. However, the ionomer preferably has a viscosity from about 100 to about 7,000 centipoise at 190° C. and, more preferably, has a viscosity from about 100 centipoise to about 2,000 centipoise at 190° C., so that the ionomer does not significantly effect the ability to attain the viscosity of the colored composition in the appropriate range that is either acceptable, preferred, or more preferred for use in ink jet printers.

Examples of suitable ionomers include certain Aclyn® or Actone® ionomers available from Allied-Signal Inc. of Morristown, N.J. Examples of these Allied-Signal ionomers, including the neutralizing cation, the melting point, the acid number, and the viscosity, are listed in Table 1 below:

TABLE 1

| Ionomer | Cation | Melting Point (°C.) | Acid No | Viscosity at 190° C. (Centipoise) |
| --- | --- | --- | --- | --- |
| Aclyn ® 201 | Ca | 102 | 42 | 5,500 |
| Aclyn ® 246 | Mg | 95 | Nil | 7,000 |
| Aclyn ® 262 | Na | 102 | 40 | 2,800 |
| Aclyn ® 272 | Na | 105 | 20 | 1,400 |
| Aclyn ® 276 | Na | 98 | Nil | 70,000 |
| Aclyn ® 285 | Na | 82 | 20 | 110,000 |
| Aclyn ® 290 | Zn | 99 | 60 | 900 |
| Aclyn ® 291 | Zn | 102 | 40 | 5,500 |
| Aclvn ® 293 | Zn | 101 | 30 | 500 |
| Aclyn ® 295 | Zn | 99 | Nil | 4,500 |
| Aclyn ® 250 | Mg | 102 | 90 | 800 |
| Aclyn ® 296 | Zn | 104 | 90 | 2,000 |
| Aclyn ® 362 | Zn | 104 | 135 | 2,500 |
| Aclyn ® 363 | Zn | — | 90 | 110,000 |
| Aclyn ® 280 | Na | 97 | 90 | 650 |
| Actone N | — | 100 | 5 | 30,000 |
| Actone 1 | — | 101 | 37 | 5,500 |

As noted, the inventive color concentrate may form the first portion of the colored composition of the present invention. The second portion includes a base component and may also include a second colorant blend agent and one or more functional or protective additives. Together, the ingredients of the first portion, exclusive of the colorant, and the ingredients of the second portion make up a vehicle for the colorant of the colored composition. The concentrations of the color concentrate, the base component, and the second colorant blend agent in the colored composition may be varied depending upon the use of the colored composition. Preferably, to minimize operational difficulties, such as corrosion, and to maximize homogeneity in the colored composition, water is excluded from both the color concentrate and the second portion.

When the colored composition is the hot melt ink used in conventional ink jet printers, the concentration of the color concentrate in the colored composition may be from about 0.1% to about 80% and the concentration of the base component in the colored composition may be from about 20% to about 99.9%. Preferably, the concentration of the color concentrate in the colored composition is from about 0.5% to about 60%, and the concentration of the base component and the colored composition is from about 40% to about 99.5%. More preferably, the concentration of the color concentrate in the colored composition is from about 30% to about 50% and the concentration of the base component in the colored composition is from about 50% to about 70%.

The concentration of the second colorant blend agent is present in the colored composition in an effective amount ranging from 0% up to about 30%. Preferably, the concentration of the second colorant blend agent in the colored composition ranges from about 0.5% to about 20%. More preferably, the concentration of the second colorant blend agent in the colored composition ranges from about 1% to about 5% to minimize the cost of the colored composition while retaining good operational and performance characteristics.

It is believed that the colored composition, when used as hot melt ink in ink jet printing, should have a viscosity of from about 5 and about 50 centipoise at 125° C. to perform acceptably in hot melt ink jet printers. Preferably, to realize enhanced operational abilities in hot melt ink jet printers, the hot melt ink has a viscosity of from about 15 to about 30 centipoise at 125° C. More preferably, to further enhance operational abilities in hot melt ink jet printers, the hot melt ink has a viscosity of from about 20 to about 25 centipoise at 125° C. Still more preferably, the hot melt ink has a viscosity of from about 10 centipoise at 150° C. to about 50 centipoise at 100° C.

The viscosity of the resinous component of the hot melt ink usable in ink jet printing may range up to about 3,500 centipoise at 160° C. and the viscosity of the ionomer used as the first colorant blend agent may range up to about 7,000 centipoise at 190° C. The base component of the hot melt ink may function as a viscosity modifier that offsets the relatively high viscosities of the resinous component and the ionomer to reduce the viscosity of the hot melt ink to the acceptable, preferred, or more preferred range, as appropriate. To perform acceptably as the viscosity modifier, the viscosity of the base component should be less than about 50 centipoise at 125° C. Preferably, the base component has a viscosity of less than about 35 centipoise at 125° C. Still more preferably, the base component has a viscosity of less than about 25 centipoise at 125° C.

As noted, the base component may function in the colored composition to modify the relatively high viscosity of the resinous component. The relatively low viscosity of the base component, as compared to the resinous component, typically renders the base component either less polar than the resinous component or non-polar in nature. Polar dyes and pigments, such as those suitable for use as the colorant, have low solubility and dispersability, respectively, in non-polar or low polarity compounds. However, the first colorant blend agent, the second colorant blend agent, or a combination of the first and second colorant blend agents has been found to substantially solve the problem of combining polar dyes and pigments with non-polar or low polarity compounds, such as those that make up the base component. Except in the claims, subsequent references to "colorant blend agent" that do not specify either "first colorant blend agent" or "second colorant blend agent" are understood to mean "the first colorant blend agent, the second colorant blend agent, or a combination of the first and second colorant blend agents", unless otherwise indicated.

When the color concentrate is included in the colored composition, the colorant blend agent, in the form of the ionomer, increases the extent, rate and ease of dye solubilization in the base component, increases the extent, rate and ease of pigment dispersion in the base component, and enhances colorant distribution uniformity throughout the colored composition. This is another example of how the first colorant blend agent, as well as, the second colorant blend agent act as dye solubilizers and pigment dispersants.

Regarding the enhanced extent, uniformity, rate, and ease of dye solution, it is believed that the ionomer, without direct interaction with the dye, modifies the base component to make the base component, and therefore the colored composition, more polar in nature, thereby substantially enhancing uniform solution of the dye in the colored composition. Inclusion of the ionomer as the colorant blend agent therefore solves the problem of limited uniformity of dye solution in colored compositions, such as hot melt inks, when non-polar or relatively low polarity materials, such as waxes or wax-like materials, are blended with more polar resins. In relation to the enhanced extent, uniformity, rate, and ease of pigment dispersion, it is believed that the ionomer directly interacts with the particles of pigment such that polar areas of the ionomer adhere to polar areas of the pigment and non-polar or less polar areas of the ionomer disperse away from more polar parts of the colored composition, such as the resinous component, thereby substantially enhancing dispersion of the pigment in the colored composition.

The colorant blend agent also aids in obtaining and maintaining coupled, homogenous mixture of the resinous component and the base component and aids in obtaining and maintaining coupled, homogenous mixture of the color concentrate and the second portion. As an added bonus, the colorant blend agent significantly and surprisingly increases concentrations of the colorant, such as the dye or pigment, that are attainable in the colored composition, such as the hot melt ink, as compared to conventional inks.

The coupling effect observed when the colorant blend agent helps obtain and maintain homogenous mixture of the resinous component and the base component and homogenous mixture of the color concentrate and the second portion was discovered to vary somewhat, when different ionomers are used as the colorant blend agent, depending on the acid number of the ionomer used. The coupling effect is believed to arise from enhanced linkage of polar ingredients of the colored composition with less polar and non-polar ingredients of the colored composition. It was found that, with all other variables equal, use of Aclyn® 293 ionomer in place of Aclyn® 290 ionomer resulted in enhanced homogeneity of the resinous component and the base component and enhanced homogeneity of the color concentrate and the second portion, as compared to resinous component/base component homogeneity and color concentrate/second portion homogeneity when the Aclyn® 290 ionomer was used.

The Aclyn® 293 ionomer has an acid number of 30, whereas the Aclyn® 290 ionomer has an acid number of 60. The acid number refers to the number of milligrams of potassium hydroxide (KOH) that are required to fully neutralize one gram of the ionomer. The ionomer used as the colorant blend agent preferably has an acid number of less than about 60 and, more preferably, has an acid number of about 40 or less, to maximize the coupling effect of the ionomer on the resinous component and the base component and on the resinous component and the second portion of the colored composition. The larger percentage of non-neutralized COOH groups in the Aclyn® 290 ionomer, as compared to the Aclyn® 293 ionomer, is believed to contribute to the observed differences in homogeneity. The cation, namely zinc, which neutralizes the COOH groups in the Aclyn® 290 and Aclyn® 293 ionomers has a higher charge density than the OH group the zinc replaces. The larger percentage of higher charge density present in the Aclyn® 293 ionomer, as compared to the Aclyn® 290 ionomer, allows the Aclyn® 293 ionomer to enhance the polarity of the base component to a higher degree than the Aclyn® 290 ionomer. The enhanced polarity of the base component aids in homogenizing the resinous component and the base component and aids in homogenizing the color concentrate and the second portion to a higher degree than when the Aclyn® 290 ionomer is substituted for the Aclyn® 293 ionomer.

Surprisingly, as already mentioned, the ionomer increases the extent, uniformity, rate, and ease of both dye solution and pigment dispersion in the base component. These enhanced dye solution and pigment dispersion characteristics are especially pronounced when the base component is non-polar or when the base component is substantially less polar than the resinous component.

When the color concentrate is used in the colored composition, it was discovered to be suitable for the first colorant blend agent to make up to about 70% of the combined weight of the first and second colorant blend agents in the colored composition. However, since the enhanced dye solution and pigment dispersion characteristics were found to be more pronounced when the concentration of the second colorant blend agent in the colored composition exceeds the concentration of the first second colorant blend agent in the colored composition, the first colorant blend agent preferably makes up to about 45% of the combined weight of the first and second colorant blend agents in the colored composition. Still more preferably, to maximize colorant concentration in the colored composition, the second colorant blend agent makes up about 100% of the combined weight of the first and second colorant blend agents in the colored composition.

The base component must be compatible with other ingredients included in the colored composition. Additionally, the base component must also have appropriate structural and physical properties such that the base component performs required functions in the colored composition and the colored composition performs adequately in desired applications. For example, if the colored composition is to be used as the hot melt ink in ink jet printing, the resinous component should be capable of performing required functions, such as viscosity modification, within the colored composition and should also contribute appropriate physical properties, such as melting point and viscosity, such that the colored composition has any physical properties, such as melting point and viscosity at temperature of use, that are required for particular applications. Additionally, it is to be understood that the observed advantages of the first and/or second colorant blend agents of the present invention, such as the ability to aid in obtaining and maintaining homogenous mixture of the first and base components and uniform distribution of the colorant throughout the colored composition, are especially pronounced when the polarity of the base component is substantially less than the polarity of the resinous component. Nonetheless, it has been found that substantial advantages of the first and second colorant blend agents are realized even if the polarity of the second blend agent approximates, or even exceeds, the polarity of the first colorant blend agent.

Examples of suitable materials for the base component include waxes and wax-like materials. A definition of "waxes" can be found in *Industrial Waxes* by H. Bennett; Vols. 1 & 2; Chemical Publishing Company, Inc., New York, N.Y. (1975). Bennett defines a wax as "an unctuous solid with varying degrees of gloss, slipperiness, and plasticity, which melts readily."

Examples of suitable waxes include natural waxes, such as waxes of vegetable, animal, or mineral origin; petroleum waxes, such as paraffin, paraffin wax, and microcrystalline wax; higher fatty acids, such as those with between about 14 and 24 carbons; and higher alcohols. Examples of suitable wax-like materials include fatty acid esters; fatty acid amides; ketones of higher fatty acids; aromatic amides, such as benzamide; aromatic sulfonamides, such as o-toluenesulfonamide and p-toluenesulfonamide; higher sulfones, such as linear long chain sulfones; polyolefin resins; polystyrene resins; polyacrylic resins; certain other polymeric materials; and mixtures of linear primary alcohols with linear long chain amides or fatty acids amides. The base component may comprise any one or a compatible combination of one or more of the aforementioned suitable waxes and wax-like materials. Keeping in mind that the base component should be compatible with other ingredients of the colored composition.

Examples of suitable natural waxes include wood wax, whale wax, beeswax, lanolin, carnauba wax, rice wax, canderilla, montan wax, cerresin wax, and gilsonite. Gilsonite is available from American Gilsonite Co. of Salt Lake City, Utah.

Examples of suitable paraffins include n-paraffin and iso-paraffin, in which the number of carbon atoms is between about 23 and 32. Examples of paraffin wax include paraffin wax numbers 115, 120, 125, 130, 135, 140, 150, and 155; HNP-3, HNP-9, HNP-10, HNP-11, and HNP-16; SP-0145, SP-1035, SP-3040, SP-3035, and SP-0110. Each of these paraffin waxes are available from Nippon Seiro Co., Ltd of Tokyo, Japan.

Examples of suitable microcrystalline waxes include Hi-Mic-2045, Hi-Mic-1045, CARTOWAX-3025, CARTOWAX-3735 and CARTOWAX-3646. Each of these microcrystalline waxes are available from Nippon Seiro Co., Ltd.

Examples of suitable fatty acids include stearic acid, lauric acid, decanoic acid, myristic acid, docasanic acid, brasidic acid, behenic acid, azelaic acid, glutaric acid, and sebasic acid. Examples of suitable fatty acid esters include fatty acid esters of sucrose and of sorbitane. One preferred example of a suitable fatty acid ester is glycerol ester of hydrogenated resin, which is available as Foral 105 from Hercules, Inc. of Houston, Tex. Examples of suitable fatty acid ketones include stearone, laurone, and n-cyclohexyl p-toluene sulphonamide.

Examples of suitable higher alcohols include linear primary alcohols with from about 16 to about 70 carbon atoms such as stearyl alcohol, behenyl alcohol and lauryl alcohol.

Examples of suitable fatty acid amides include primary and secondary monoamides, such as stearamide, stearyl stearamide, behenamide, behenyl behenamide, amide eructate, amide laureate, coconut acid amide, palmatic acid amide, oleyl pamitamide, brassideamide, acetamide, amide oleate, propionamide, and ricinoleic acid amide. In one embodiment, the resinous component is preferably made of about 75% stearyl stearamide and about 25% stearamide. Preferred examples of oleamide, stearamide, stearyl stearamide, and oleyl pamitamide are, respectively, Kemamide® U, Kemamide® S, Kemamide® S-180, and Kemamide® P-181, which are each available from Witco Chemical Corp. of Fairfield, N.J.

Suitable linear long chain sulfones have from about 4 to about 16 carbon atoms and include n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, and n-hexadecyl sulfone.

Examples of suitable polyolefin resins include polystyrene; high-, medium-, and low-density polyethylenes; halogenated polyethylene; halogenated polypropylene; polyethylene copolymers with vinyl acetate, acrylate ester, or α-olefin, such as butene, hexene, and 4-methyl-1-pentene; polypropylene homopolymer; ethylene-grafted polypropylene; polypropylene copolymers with α-olefin such as butene, hexene, and 4-methyl-1-pentene; modified polypropylene blended with elastomeric polymer; and modified polyolefins formed by reacting poly-1-butene, poly-4-methyl-1-pentene, or the above-mentioned polyolefin with maleic anhydride. One preferred polyolefin resin is polyethylene wax, which is available as Polywax® 500 from Petrolite Corporation of St. Louis, Mo.

Examples of the certain other polymeric materials include cumarone-indene polymer, cyclic ketone polymers, styrene allyl alcohol polymers, polystyrenes, polyvinyl toluene/ methylstyrene polymer, alkyl hydrocarbon polymer, aryl hydrocarbon polymers, alkyl aryl hydrocarbon polymer, terpene polymers, styrene-acrylates, ethylene-vinyl acetates, and polypropylene.

Suitable linear long chain amides or fatty acid amides of the noted mixtures of linear primary alcohols with linear long chain amides or fatty amides include linear long chain amides and fatty acid amides with from about 6 to about 24 carbon atoms, including Paricin 9 (propylene glycol monohydroxystearate), Paricin 13 (glycerol monohydroxystearate), Paricin 15 (ethylene glycol monohydroxystearate), Paricin 220 (N(2-hydroxyethyl)-12-hydroxystearamide), Paricin 285 (N,N'-ethylene-bis-12-hydroxystearamide), Flexricin 185 (N,N'-ethylene-bis-ricinoleaimde), and the like, all available from CasChem Co., Bayonne, N.J., in an amount of from about 20 to about 70 percent by weight of the base component, and Kemamide® B (behenamide/arachidamide), Kemamide® W40 (N,N'-ethylenebisstearamide), Kemamide® P-181 (oleyl palmitamide), Kemamide® S (stearamide), Kemamide® U (oleamide), Kemamide® E (erucamide), Kemamide® O (oleamide), Kemamide® W45 (N,N'-thylenebisstearamide), Kemamide® W20 (N,N'-ethylenebisoleamide), Kemamide® E180 (stearyl erucamide), Kemamide® E221 (erucyl erucamide), Kemamide® S-180 (stearyl stearamide), Kemamide® S221 (erucyl stearamide), and the like, all available from Witco Chemical Corp., in an amount front about 10 to about 40 percent by weight of the base component.

The second colorant blend agent that is included in the colored composition may be any of the materials previously listed for use as the first colorant blend agent. Indeed, the first colorant blend agent and the second colorant blend agent may be the same or different material. The second colorant blend agent, such as the ionomer, should be soluble in the base component when the second colorant blend agent and/or the base component are in the molten state. Preferably, the second colorant blend agent solubilizes in the base component quickly, within about 5 minutes at a base component/ionomer ratio of from about 10:1 to about 2:1 on a weight basis, when the second colorant blend agent and/or the base component are in the molten state.

Various functional and protective additives are preferably included in the colored composition to further enhance the appearance and performance of the colored composition. For example, the colored composition preferably includes an ultraviolet light inhibitor that absorbs ultraviolet radiation and protects the colored composition from photodegradation and weathering. The ultraviolet inhibitor may have a concentration in the colored composition ranging front about 0.1% to about 10%. Preferably, the ultraviolet inhibitor concentration is from about 1% to about 7%. More preferably, the concentration of the ultraviolet inhibitor in the colored composition is from about 1.5% to about 5%.

The colored composition preferably also includes a hindered amine additive for scavenging and absorbing any free radicals created in the colored composition despite use of the ultraviolet light inhibitor. The hindered amine additive may be present in the colored concentration at a composition of from about 0.5% to about 5% and is preferably present at from about 0.5% to about 4%. The more preferred concentration range of the hindered amine additive in the colored composition is from about 0.5% to about 3%.

Suitable ultraviolet light inhibitors include substituted benzotriazoles such as Tinuvin® 326, 327, 328, 384, 571, 900, and 1130, all of which are available at Ciba-Geigy. Suitable hindered amine additives include Tinuvin® 123, 144, 292, 622CD, 765, and 770, all of which are available from Ciba-Geigy.

A thermal stabilizer is also preferably added to the colored composition to act as a heat sink and prevent degradation of the flow rheology of the colored composition during repeated heating and cooling cycles to more than 100° C. The thermal stabilizer may be present in the colored composition at a concentration of from about 0.1% to about 10% and is preferably present in the colored composition at a concentration of from about 0.1% to about 7%. More preferably, the thermal stabilizer concentration in the colored composition is from about 0.1% to about 5%. The thermal stabilizer is preferably added to the colored composition as part of the color concentrate, rather than as part of the second portion.

Examples of compounds that are suitable for use as the antioxidant and/or the thermal stabilizer include hindered phenols such as BHT, TBHQ, and BHA. BHT is sold under the trade name Tenox and is available from Eastman Chemical Products, Inc. of Kingsport, Tenn. TBHQ is sold under the trade name Ethanox and is available from Ethyl Corporation of Richmond, Va. BHA is sold under the trade name Irgazox and is available from Ciba-Geigy of Ardsley, N.Y. Another compound, Irganox® 1010, which is available from Ciba-Geigy, may also be used both as the antioxidant and as the thermal stabilizer.

The colored composition may also include a gloss enhancing agent that increases the gloss of the colored composition after the colored composition is applied to a substrate. Some consumer's tastes and certain applications make it desirable to have the capability of adjusting the glossiness of the applied colored composition.

The gloss enhancing agent may be present in the colored composition at up to about 10%, but is preferably present in the colored compound at a concentration of from about 1% to about 5%. The gloss enhancing agent is preferably added to the colored composition as part of the color concentrate, rather than as part of the second portion. Examples of suitable gloss enhancing agents include ethylene-acrylic acid copolymer compounds, such as A-C® 540, A-C® 540A, and A-C®580, each of which are available from Allied-Signal, Inc.

Additionally, the colored composition may include a corrosion inhibitor. The corrosion inhibitor helps prevent the colored composition from corroding print system equipment during longer equipment runs where the colored composition is maintained as a liquid at temperatures above ambient. The corrosion inhibitor, if included, may be present at from about 1% to about 10% and is preferably included at a concentration from about 2% to about 5%. One suitable corrosion inhibitor is 2-benzothiazolylthio sussinic acid, available from Ciba-Geigy as Irgacor 252.

The colored composition may also include a conventional plasticizer, such as N-ethyl-toluene-sulfonamide, available as Ketjenflex® 8 from Akzo Chemie of Ameersfoort, Holland, or pentaerythritol benzoate, available as Benzoflex® S-552 from Velsicol Chemical Corp. of Chicago, Ill. Preferably, the colored composition does not include the plasticizer since the inventor has discovered that conventional plasticizers are often somewhat thermally unstable during repeated heating and cooling cycles. Indeed, the inventor found that the base component performs most functions of conventional plasticizers while enhancing the rheology of the colored composition.

A surfactant may also be incorporated into the colored composition. The surfactant aids in decreasing the surface tension of the colored composition and enhancing spreadability of the colored composition, such as the hot melt ink, on surfaces the colored composition is applied to. The surfactant is preferably added to the colored composition as part of the color concentrate, rather than as part of the second portion. One example of a suitable surfactant is 2,4,7,9-tetramethyl-5-decyne-4,7-diol, which is available as Surfynol® 104 from Air Products & Chemicals, Inc. of Allentown, Pa.

The method of preparing the colored composition of the present invention generally involves separate preparation of the color concentrate and the second portion of the colored composition. The color concentrate includes the resinous component and the colorant, and may also include the first colorant blend agent and other protective or functional substances, such as the antioxidant and the gloss enhancing agent. The second portion includes the base component and preferably also includes the second colorant blend agent and one or more of the protective or functional additives.

Preferably, the color concentrate and the second portion of the colored are prepared simultaneously, though the color concentrate and the second portion may be prepared at different times and even at different locations. For example, the color concentrate may be prepared at time "1" and then stored after it is solidified. The second portion may be prepared at time "2", which is later than time "1", and added to the color concentrate to make the colored composition. Furthermore, the color concentrate may be prepared at a different location than the second portion, such as at a color concentrate manufacturing facility, and then shipped to another processing site, such as a sub-manufacturing location or a customer's facility, and combined with the second portion to make the colored composition.

An appropriate mixer, such as a conventional high shear mixer, is used to mix molten ingredients of the color concentrate. It should be understood that melting and mixing conditions for the color concentrate are selected to eliminate or minimize thermal degradation or oxidation of ingredients of the color concentrate. For example, mixing temperatures should be kept at the lowest possible value and the heating period of the ingredients should be minimized. Additionally, agitation of the ingredients should be continuous to prevent development of hot spots in mix vessels. Furthermore, the speed of the mixer should be optimized to allow adequate mixing while preventing atmospheric air from being introduced into the color concentrate. Preferably, the vessel used to make the color concentrate is operated under a vacuum to minimize air incorporation into the color concentrate.

To make the color concentrate, the material or materials (hereinafter "material(s)") of the resinous component, which are typically available in granular or chunk form, are placed in a first mix vessel (not shown) which is heated preferably to about 125° C. to melt the material(s) of the resinous component. If more than one material is used, the multiple materials of the resinous component may be sequentially placed in the vessel for sequential melting, though all of the materials of the resinous component are preferably placed in the vessel at the same time to minimize the time the materials are exposed to the melt temperatures in the absence of the antioxidant.

After the resinous component is melted, the antioxidant, which is typically powdered, is added to the resinous component. Additionally, the first colorant blend agent, if included, is preferably also added to the resinous component at the same time as the antioxidant, though the first colorant blend agent may be added either before, with, or after the antioxidant. No differences in color concentrate or colored composition properties or qualities are observed due to differences in relative timing of antioxidant addition and colorant blend agent addition to the melted resinous component. Nonetheless, the first colorant blend agent is preferably added after the resinous component is melted to minimize the potential for preferential reaction of the first colorant blend agent with any particular material of the resinous component. The first colorant blend agent may be melted and added as a liquid to the melted resinous component or may be added as a solid, such as in chunks. No differences in color concentrate or colored compound properties or qualities are observed, as between liquid and solid addition of the first colorant blend agent.

The colorant is added to the resinous component after the first colorant blend agent and the antioxidant are added. A sufficient amount of the colorant is added to obtain the desired colorant concentration in the color concentrate. The color may include one or more dyes, one or more pigments, or a combination of one or more pigments and one or more dyes.

The colorants are preferably heated before being added to the mix vessel to remove any adsorbed surface moisture. Less preferably, the colorants may be used as received from the supplier without heating to remove adsorbed surface moisture.

After the ingredients of the color concentrate have been melted and mixed, the color concentrate may be poured into molds and cooled to solidify the color concentrate. Alternatively, the color concentrate may be maintained in the molten state as a liquid for later combination as a liquid with the second portion to make the colored composition.

When the color concentrate is cooled and solidified, the physical properties of the solidified color concentrate, such as the melting point, the viscosity, the colorant concentration and colorant homogeneity in the concentrate have been found to remain stable despite long term storage of the color concentrate for as long as about three months. In fact, color concentrate that had been stored for approximately three months as a solid was blended with the second portion to make the colored composition. The resultant colored composition exhibited excellent rheology and performed well in all aspects, including ink jet printing.

The second portion of the colored composition is prepared by placing the material(s) of the base component and any of the functional and protective additives, such as the ultraviolet light inhibitor, the hindered amine additive, the thermal stabilizer, and the corrosion inhibitor, in a second mix vessel (not shown) to minimize melting and mixing times. Alternatively, the functional and protective additives may be added after the base component has melted. The second mix vessel, after addition of the material(s) base component and any additives, is then heated to about 125° C. to melt the base component and the additive.

The second mix vessel preferably includes a mixer similar to the high shear mixer used in the first mix vessel. The mixer is operated to intimately blend the base component and any additives. Similar precautions to those taken while making the color concentrate should be taken to minimize the chance for thermal oxidation or degradation of second portion ingredients and minimize introduction of air into the second portion.

As noted, the color concentrate may include the first colorant blend agent and the second portion may include the second colorant blend agent. Additionally, either the first colorant blend agent may be excluded from the color concentrate or the second colorant blend agent may be excluded from the second portion. The second colorant blend agent may be added to the second mix vessel after the base component and any additives have melted. The second colorant blend agent is preferably added after the base component has melted and homogeneously mixed to minimize preferential reaction of the second colorant blend agent with any particular material of the base component. The second colorant blend agent may be melted and added to the base component as a liquid or may be added as a solid, such as in chunks. No difference in colored composition properties or qualities are observed as between addition of the second colorant blend agent as a solid or as a liquid.

The color concentrate and the second portion may be combined in any predetermined proportion to yield the colored composition with specific physical, functional, and visual properties, such as viscosity, melting point, and color. As an alternative, select combinations of one or more color concentrates, having different physical, -functional, and visual properties, may be added to select combinations of one or more second portions, having different physical, functional, and visual properties, to yield the colored combination with additional combinations of physical, functional, and visual properties, such as viscosity, melting point and color.

Various techniques for combining the color concentrate and the second portion have been determined. For example, if the color concentrate and the second portion are each molten, the second portion may be poured into the color concentrate. This is preferable to pouring the molten color concentrate into the molten second portion since the molten color concentrate is typically substantially more viscous than the molten second portion and therefore does not pour well. On the other hand, the second portion is typically quite fluid and pours very well. If an attempt is made to pour the molten color concentrate, a substantial amount of the molten color concentrate may be left in the vessel, though the remaining color concentrate may be recovered at the cost of extra time and labor.

As another option, if the color concentrate and the second portion have cooled and solidified, they may be separately remelted and combined as liquids or, alternatively, may be combined as solids and remelted together. The solid color concentrate and the second portion may also be processed, such as by crumbling or grinding, to speed melting and mixing upon reheating.

Alternatively, solid color concentrate may be added to molten second portion in the presence of sufficient added heat to maintain the molten state of the colored composition while mixing the color concentrate and the second portion. Similarly, the solid second portion may be added to molten color concentrate with sufficient added heat to maintain the molten nature of the colored composition while the color concentrate and the second portion are mixed.

After combination of the color concentrate and the second portion is complete, the molten colored combination is preferably allowed to flow through a filter, such as a stainless steel screen of select micron size, to remove extraneous materials. Preferably, the screen is maintained at a temperature about 50° C. to 75° C. above the melting point of the colored composition, such as about 125° C. for hot melt ink, to minimize solidification of the colored composition on the screen. In the inventor's experience, when the screen has openings sized from about 5 to about 7 microns wide, nothing is typically caught on the screen when the inventive colored composition made by the described method is filtered. On the other hand, significant amounts of debris, such as undissolved dye and non-dispersed and agglomerated pigment, are often captured on the screen if both the first and second colorant blend agents are excluded from the colored composition or if the ingredients of the colored composition are mixed other than as described, such as by combining all of the ingredients of the colored composition before melting and mixing the ingredients.

After filtering, the colored composition may be poured into one or more molds and allowed to cool to room temperature to solidify. No particular precautions need be taken when storing the colored composition, as a solid, other than assuring storage of the colored composition at a temperature below the melting point of the colored composition and, preferably, at about 10° C. or more below the melting point of the colored composition. The colored composition may be stored as a solid at relative humidities ranging from 0% to 100% since the colored composition has been found to be water resistant.

The colored composition of the present invention may be utilized in various applications. As already noted, the colored composition may be formulated as the hot melt ink for ink jet printers by selecting the ingredients of the color concentrate and the second portion to yield the ink with suitable physical and visual properties, such as viscosity, melting point, and glossiness, for ink jet printing. A printing system 10 incorporating an ink jet printer 12 for directing hot melt ink onto a substrate 14 is shown in FIG. 1. The printer 12 may be any conventional ink jet printer. The printer 12 includes a head 16 with a printer nozzle 18 that ejects small distinct volumes 20 of hot melt ink. The head 16 is mounted on a base 22 which includes a heater (not shown) for liquefying the hot melt ink and for maintaining the hot melt ink in the liquid state within reservoirs (not shown) which supply hot melt ink to the head 16. A chamber 24 receives the hot melt ink in the solid state. The hot melt ink is then subsequently melted from the solid state to the liquid state within the reservoirs of the base 22 by the heater.

The printer 12 may be a continuous jet type printer or, preferably, may be an impulse jet type printer, such as a drop-on-demand type printer. In continuous jet type printers, a succession of distinct volumes 20 are ejected from the nozzle 18 and are projected electrostatically toward the substrate 14. Selected distinct volumes 20 are deflected electrostatically into a gutter (not shown), while the remaining distinct volumes 20 impinge on and adhere to the substrate 14 to form a character 26 or a FIG. 28 on the substrate 14 according to a predetermined pattern. In the preferred impulse jet type printer, the volume of a pressure chamber (not shown) is suddenly decreased by impression of an electrical driving pulse and a single one of the distinct volumes 20 is jetted from the nozzle 18 communicating with the chamber. Thus, a single distinct volume 20 of hot melt ink is transferred to the substrate by a single driving pulse, after which the printer 12 returns to its original state. In use, a predetermined succession of distinct volumes 20 is ejected in response to a predetermined succession of drive pulses to form the character 26 or the FIG. 28 on the substrate 14 according to the predetermined pattern.

The hot melt ink should meet several requirements to be used in the printer 12, such as the impulse jet type printer. For example, physical properties of the ink such as viscosity should be within proper ranges, such as the aforementioned acceptable, preferred or more preferred ranges, if the ink is to be jetted properly. Also, the ink must not clog the nozzle 18. Additionally, the ink should be heated sufficiently above the melting point to have required properties on contact with the substrate 14. Preferably, hot melt ink that is used in the printer 14 is heated to between about 20° C. and about 80° C. above the melting point of the hot melt ink to assure that the distinct volumes 20 do not begin to solidify before contacting the substrate 14. The hot melt ink must also produce the character 26 or the FIG. 28 with sufficient optical density and color characteristics. The ink must also become affixed to the substrate 14 at a high rate and should not wrinkle, curl, or otherwise adversely effect the substrate 14. Further, the hot melt ink must form high-resolution, substantially-uniform circular dots on the substrate 14 which are resistant to water, common solvents, light, and abrasion.

The hot melt inks of the present invention as applied, such as to the substrate 14 of FIG. 1, have been found to exhibit a relatively high lightness value (L*) and a relatively high chroma ($C^*_{ab}$) value, especially when applied to form thin films of substantially uniform thickness. Preferably, a substantially uniform thin film of the inventive hot melt ink with a thickness ranging from about 2 microns to about 40 microns, when the color of the ink is not black, has an L* value of at least about 40, more preferably at least about 45, and still more preferably at least about 50. Additionally, the about 2 micron to about 40 micron thick film made of the inventive hot melt ink preferably exhibits a relatively high chroma ($C^*_{ab}$) value of at least about 80 for a subtractive primary yellow composition; at least about 45 for a subtractive primary magenta composition, and at least about 50 for a subtractive primary cyan ink composition. More preferably, the about 2 micron to about 40 micron thick film of the hot melt ink exhibits a relatively high chroma ($C^*_{ab}$) value of at least about 90 for a subtractive primary yellow composition; at least about 55 for a subtractive primary magenta composition, and at least about 60 for a subtractive primary cyan ink composition. It is also important that the subtractive primary black ink composition of the hot melt ink be at a minimum reflectance level to maximize the optical density of the subtractive primary black ink composition. Accordingly, the L* value of the substantially uniform thin film of a subtractive primary black hot melt ink with a thickness ranging from about 2 microns to about 40 microns should be not more than about 12, more preferably not more than about 10, and still more preferably not more than about 9. In one embodiment, the thickness of the respective substantially uniform thin films where the respective L* and $C^*_{a,b}$ values of the respective hot melt inks are determined preferably ranges from about 2 microns to about 20 microns. In another embodiment, the thickness of the respective substantially uniform thin films where the respective L* and $C^*_{ab}$ values of the respective hot melt inks are determined preferably ranges from about 16 microns to about 20 microns.

It will also be appreciated that the printer 12 may include a plurality of modules (not shown) that include the head 16, the nozzle 18, the base 22, and the chamber 24. Each module may include one or more of the nozzles 18. The module may be divided into sub-portions for jetting different colors of hot melt ink out of different nozzles 18 or may be dedicated to jetting only a single color of hot melt ink out of the jets 18. Different modules may also be dedicated to jetting different colors of hot melt ink from different nozzles 18 of the respective modules.

It will be appreciated that the substrate 14 may be scanned relative to the head 16 and/or the head 16 may be scanned relative to the substrate 14 to allow the distinct volumes 20 of the hot melt ink to be laid down on the substrate 14 to achieve the desired character 26 or FIG. 28. It will also be understood that a wide visual color spectrum may be achieved by applying different colors of the distinct volumes 20 in side-by-side relation or by superimposing different colors of the distinct volumes 20 in a subtractive process. In the former, different colors of the distinct volume 20 are deposited on the substrate 14 side-by-side in the predetermined pattern (not shown). The different colored volumes 20 are integrated in the observer's eye so that the observer perceives a color dependent upon the relative numbers and/or sizes of the different color volumes 20 at each part of the character 26 or FIG. 28. In the subtractive process, printer 12 superimposes different colors of the volumes 20 in the predetermined pattern on the substrate 14 so that each dot 30 applied to the substrate 14 is composed of one or more layers (not shown) of up to about three or four of the distinct volumes 20 having different color intensities, depending upon the color requirements of the particular part of the character 26 or FIG. 28. Each dot layer absorbs a portion of the spectrum of the ambient light illuminating the substrate 14 so that the observer's eye senses the remainder of the light spectrum. Thus, when several dot layers, each of a different color, are present in a single dot 30 in the predetermined pattern, several spectral versions are absorbed simultaneously so that a smaller part of the spectrum of the incident light is visible to the observer, causing the observer's eye to sense a mixed color produced by the subtractive mixture of the various colors of each dot 30.

To achieve proper spreading and flattening of the volumes 20 of ink, the substrate 14 should have a sufficiently high surface energy of at least about 25 dynes/cm. Preferably, the surface energy of the substrate 14 exceeds about 28 dynes/cm, with a surface energy of about 30 dynes/cm being more preferred. Also, the surface energy of the substrate 14 should be higher than the surface tension of the hot melt ink. In this connection, the surface tension of the hot melt ink should be less than about 40 dynes/cm and preferably less than about 30 dynes/cm. More preferably, the surface tension of the hot melt ink is from about 5 to about 10 dynes/cm lower than the surface tension of the substrate 14.

The substrate 14 may be made of any suitable medium for viewing the character 26 or the FIG. 28, including a substantial non-transparent paper (not shown) or a substantially transparent support, such as a transparency 32 for use on an overhead projection system (not shown). When the substrate 14 takes the form of the substantially non-transparent paper, the paper may be any suitable printing paper. On application of the distinct volumes 20 to the paper, the hot melt ink is partially injected into the substrate 14 as a liquid before the hot melt ink solidifies on changing phase. Preferably, the percentage of the applied hot melt ink that is absorbed into the paper is optimized so the hot melt ink does not penetrate through the paper and show through the side of the paper opposite the side the character 26 or the FIG. 28 is printed on. Solidification of the portion of the ink injected into the paper produces physical bonding that strongly anchors the ink to the paper. Additional physical bonding occurs due to solidification of the ink about surface fibers (not shown) of the paper.

Certain advantages of the inventive hot melt ink have been found to be most strongly obtained when the paper is sized with basic compounds, such as clay, calcium carbonate, etc. These advantages are most pronounced when the ionomer of the first and/or second colorant blend agent has been partially neutralized, as opposed to fully neutralized. The surprising discovery may be explained by development of chemical bonds between (1) unneutralized COOH groups of the partially neutralized ionomer and (2) the more basic structure of the sized paper. This enhanced bonding, apparently due to the ionomer being only partially neutralized, is also surprising since it is observed to occur even when the ionomer is present in the hot melt ink in the relatively low concentration range of from about 1% to about 2%.

Further advantages of the present invention are observed when the paper has a polar nature since the applied hot melt ink then exhibits still further adhesion to the paper. It is believed that the enhanced adhesion is a result of chemical bonding that occurs between polar ingredients of the hot melt ink and polar structures of the paper.

When the substrate 14 is in the form of the transparency 32, the transparency 32 may be made of any of a variety of substantially transparent materials such as an acrylic, an acrylate, an ester, a polycarbonate, a polyacetate, or a polyphthalate. Specific examples of the transparency 32 include type X-2417 transparencies manufactured by Minnesota Mining and Manufacturing Company, vinyl acetate, Mylar®, and biaxially-oriented polyethylene terephthalate.

Upon contacting the transparency 32, the distinct volumes 20 of ink are quickly cooled to return the hot melt ink to the solid state. The volumes 20 physically adhere to fibers on the surface of the transparency 32 when the volumes 20 solidify. Certain advantages of the present invention are more pronounced when the transparency 32 has a polar nature. For example, enhanced adhesion of the volume 30 of ink to the transparency 32 occurs when the transparency 32 has a polar structure. It is believed that this enhanced adhesion results from chemical bonding that occurs between polar ingredients of the hot melt ink and polar structures of the transparency 32.

Figure 2:
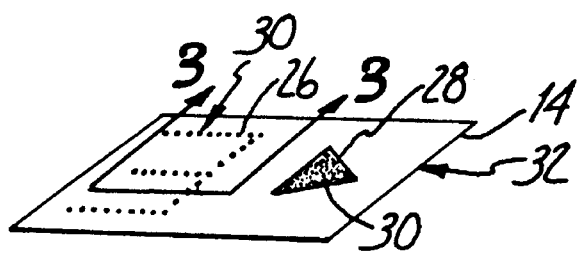
FIG. 2 is an enlarged view of a portion of the substrate of FIG. 1 that includes a distinct volume of applied hot melt ink.

As depicted in FIGS. 1 and 2, the FIG. 28 formed on the transparency 32 is made up of a plurality of the dots 30 formed by the distinct volumes 20. The hot melt ink used to form the dots 30 on the transparency 32 are formulated to enhance spreading of the dot 30 on the transparency 32.

Figure 3:
FIG. 3 is a partial sectional view through line 3—3 showing a cross-section of the distinct volume.
Figure 3:
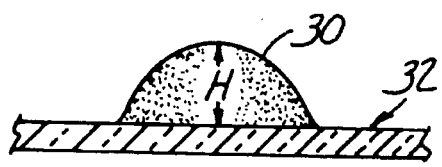
Figure 4:
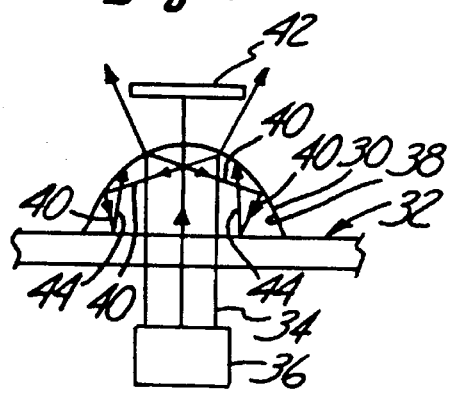
FIG. 4 is a schematic view showing light transmission through the substrate and the distinct volume depicted in FIG. 3.

It has been found that the hot melt ink of the present invention, as applied in the form of the dots 30, as in FIG. 3, exhibits excellent transparency and optical clarity so that light scattering within the dot 30 is minimized. Also, the hot melt ink, when applied to the substrate 14, exhibits excellent reflectance spectra, especially when the substrate 14 is non-transparent or substantially non-transparent. In FIG. 3, the shape of the dot 30 and the height H of the dot 30 are exaggerated so that details about light transmission through the dot 30 may be more clearly explained through the discussion associated with FIG. 4. The optical clarity along with the spectral characteristics, such as lightness and chroma, of the hot melt ink are far superior to those of existing inks. Various facets of the present invention are believed to contribute to the enhanced optical clarity and spectral characteristics.

First, crystalline ingredients are preferably minimized in the color concentrate and the colored composition. For example, though stearamide, stearyl stearamide, and low molecular weight polyethylene each have approximately the same low level of viscosity, the resinous component is preferably made of about 75% stearyl stearamide and about 25% stearamide. Stearamide is used because it is clearer in the solid state than low molecular weight polyethylene. Stearamide is used in combination with stearyl stearamide, though stearamide is not quite as clear as stearyl stearamide, because stearamide is still significantly clearer than low molecular weight polyethylene and is also somewhat lower in viscosity in the liquid state than is stearyl stearamide. Furthermore, the ionomer used as the first and/or second colorant blend agent is very clear in the solid state, even clearer than the stearyl stearamide and the stearamide. In fact, the ionomer is the clearest ingredient of all of the ingredients of the colored composition.

Additionally, the ionomer is believed to contribute to the enhanced optical clarity and spectral characteristics of the ink in several ways other the mere clarity of the ionomer. For example, the ionomer is believed to enhance uniform dye solution, uniform pigment dispersion, and ingredient homogeneity in the hot melt ink throughout handling of the ink by the printer 12 and following application of the ink as the dot 30. Of course, the ionomer and the method of the present invention also enhance spectral characteristics, such as lightness and chroma, by enhancing colorant concentration in the colored composition and hence in the hot melt ink.

Figure 5:
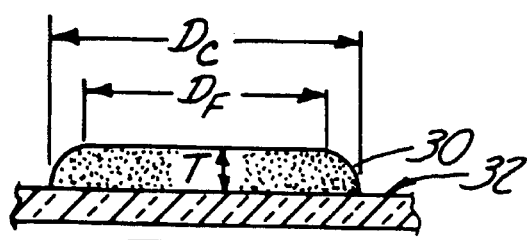
FIG. 5 is a variation of the partial sectional view of FIG. 3 illustrating flattening of the distinct volume in accordance with the present invention.

To further enhance light transmission, particularly light transmission along a substantially rectilinear path, the dot 30, which is relatively rounded in shape after adhering to the transparency 32, may be spread somewhat, as depicted in FIG. 5. For example, heat, pressure, or a combination of heat and pressure may be applied to the image 28 to spread the dot 30. Preferably, heat, and not pressure, is applied to spread the dot 30. Heat may be applied by contacting the dot 30 with a heater, such as a heated plate or roller (not shown), or by applying heated air, such as heat from a hair dryer (not shown), to the dot 30. For example, the transparency 32 and the dots 30 may be heated for between about 10 seconds to about 5 minutes at a temperature of between about 70° C. to about 140° C., depending upon the time of heating and the melting point of the hot melt ink, to remelt portions (not shown) of the dot 30 and cause the melted portions of the dot 30 to flow into closer contact with the transparency 32 before the melted portions cool and re-solidify.

After heating in accordance with the present invention, the dot 30 of FIG. 3 becomes somewhat flattened, as depicted in FIG. 5. A central portion of the volume 30 of FIG. 5 has a central diameter $D_c$ that is substantial in comparison to the full diameter $D_f$ of the volume 30 that covers the transparency 32. It is to be understood that each of the dots 30 is not necessarily circular and that the use of the word diameter is not intended to so indicate, though the dots 30 are preferably substantially circular in shape and more preferably are nearly circular in shape. It is also to be understood that the flattened surface characterized by the diameter $D_c$ is not strictly smooth. However, the flattened surface characterized by the diameter $D_c$ is sufficiently smooth such that a thickness T of each of the dots 30 varies by less than 25% and preferably by about 10% or less. Additionally, the area characterized by the diameter $D_c$ is equal to at least 20%, preferably 50%, and more preferably at least 75% of the area corresponding with the diameter $D_f$.

Referring back to FIG. 4, absent spreading of the dot 30 according to the present invention, light rays 34 from a light source 36 will strike an inner surface 38 of the dot 30 and be either reflected or refracted by the inner surface 38 along paths 40 or pass substantially unaffected through the inner surface 38 towards a lens device 42 of a conventional overhead projection system (not shown). The light rays 34 reflected by the inner surface 38 along the paths 40 are further reflected by the transparency 32 along paths 44 toward the inner surface 38 where they are again subjected to the variable effects of reflection and refraction. As readily visible from the discussion of light transmission in connection with FIG. 4, the somewhat rounded shape of the inner surface 38 has a "lens effect" that can reflect, refract, and scatter the light rays 34, thereby disrupting color definition of dots 30 attached to transparencies 32.

Figure 6:
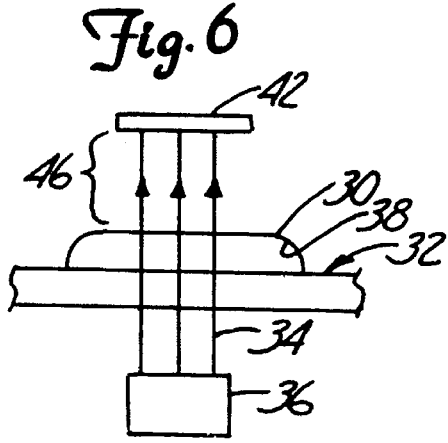
FIG. 6 is a schematic view of the substrate and distinct volume of FIG. 5 showing light transmission patterns through the flattened distinct volume.

After the dots 30 are spread somewhat, as in FIGS. 5 and 6, light rays 34 projected through dot 30 pass substantially unaffected through the inner surface 38 to the lens device 42. The flatter profile of the dot 30 minimizes refraction, reflection, and scattering of light rays 34 and promotes transmission of the rays 34 through the dot 30 in a substantially rectilinear path 46, as in FIG. 6. Spreading of each of the dots 30, as in FIGS. 5 and 6, helps create a high degree of lightness and chroma in the character 26 or FIG. 28 of FIG. 1, as measured with a transmission spectrophotometer. In combination with the substrate 14 that is highly transparent, such as the transparency 32, a projected image of the character 26 or the FIG. 28 having clearly visible and intense colors is formed when a beam of light, having the rays 34, is projected through the transparency 32 and the character 26 or FIG. 28.

Similarly, to enhance light reflectance from substrates 14 that are other than transparent, the dots 30 may be spread somewhat, as in FIG. 5. As already described, heat, pressure, or a combination of heat and pressure may be applied to the image 28 to spread the dots 30. Spreading of the dots 30 that are affixed to the substrate 14 that may be other than transparent enhances uniformity of reflection in an analogous way to the enhanced uniformity of transmission described with reference to the transparency 32. The enhanced uniformity of reflection, in conjunction with the superior clarity of the hot melt ink, further enhances the reflectance spectra of the hot melt ink, as compared to the dots 30 which are not spread. Indeed, spreading of each of the dots 30 helps create a high degree of lightness and chroma, as measured with a reflectance spectrodensitometer, in the character 26 or FIG. 28 attached to the substrate 14 that is other than transparent.

The colored composition of the present invention, whether or not used as a hot melt ink in ink jet printing or other applications, exhibits excellent physical and visual properties. For example, the colored composition and thus the hot melt ink, exhibits uniform dye solubility and pigment dispersion and also superior homogeneity of the resinous component and the base component. Additionally, the hot melt ink exhibits high clarity and enhanced spectral characteristics, and, when applied in a thin film made of dots 30 of substantially uniform thickness, superior rectilinear light transmissivity or reflectance, depending upon the transparent or opaque nature of the substrate 14. Additionally, the hot melt ink exhibits-excellent initial contact adherence to the substrate 14, as compared to existing inks. This is believed due, in part, to the enhanced chemical and physical bonding effects contributed by the ionomer. Also, the inventive hot melt ink, as applied to the substrate 14, is harder and more abrasion resistant than current inks, such as wax-based inks, which are often soft and wax-like, much like crayons. Furthermore, the hot melt ink exhibits superior water resistance, possibly due to enhanced intra-molecular forces the ionomer contributes to the hot melt ink.

PROPERTY DETERMINATION AND CHARACTERIZATION TECHNIQUES

Melting Point

Unless otherwise indicated, all melting point determinations for the color concentrate and for the colored compound were made with a Fisher-Johns Melting Point Apparatus, which is available from Fisher Scientific, Inc. of Pittsburgh, Pa. All melting points obtained are expressed in degrees centigrade (° C.), unless otherwise indicated.

Viscosity

All viscosities of the color concentrate and the colored composition were determined using a Brookfield Model DV-III programmable rheometer equipped with a temperature control unit (thermocell), unless otherwise indicated. The Brookfield Model DV-III rheometer is available from Brookfield Engineering Laboratories, Inc. of Stoughton, Mass.

In a typical test of the viscosity (the "Brookfield viscosity"), the temperature at which the viscosity was measured was set on the temperature control unit of the Brookfield rheometer. About 5.5 grams of the color concentrate or of the colored composition was placed in the viscosity measurement cell of the temperature control unit. The sample was then allowed to heat to the viscosity measurement temperature and was kept at temperature for at least 30 minutes to ensure that thermal equilibrium was attained. An appropriate spindle, identified by a spindle number and selected so that the measured viscosity was within the range of the particular spindle, was included in the measurement cell. The Brookfield viscosity was measured while running the selected spindle at a revolution per minute (RPM) rate selected based on calibration studies conducted at the direction of the inventor. For example, spindle No. 18 was rotated at about 60 RPM during viscosity determinations.

Visual Determination

Various qualitative characterizations of the visual appearance of the color concentrate, the colored composition, and comparative example ink compositions were possible. One example is qualitative visual characterizations of color intensity comparing the color intensity of comparative example ink compositions to the color intensity of the inventive colored composition. Color intensities determined by visual observation were capable of being characterized as either weak, moderate, or strong, with strong color intensity being most desired.

Another characteristic, gloss, was qualitatively determined after application of particular colored compositions to substrates. One desirable feature of the present invention is the ability to selectively choose the degree of glossiness of the colored composition depending upon the desired gloss of the colored composition. The gloss of the colored compositions was capable of being characterized either as dull, glossy, or intermediate (between dull and glossy). Other visual characterizations included observations as to whether or not flaking or chipping of the colored composition occurred after the colored composition was applied to various substrates and allowed to solidify.

Optical Density

Quantitative determinations of the optical density of various printed samples of the colored composition were measured using a Gretag Model D182 densitometer. The Gretag D182 densitometer is available from Gretag Regensdorf of Zurich, Switzerland. Optical density measurements of the inventive colored compositions were determined on print samples of the colored composition, such as the hot melt ink, that were printed using an ink jet printer, such as the DisplayMaker ExPress LARGE FORMAT INK JET PRINTER available from Lasermaster Corporation of Eden Prairie, Minn. Before optical density measurement were made, the print samples were typically heated to fill gaps between print dots and make the print samples substantially uniform in thickness.

Reflectance Spectra

Reflectance spectra for the colored composition of the present invention and for comparative example ink compositions were evaluated using a commercially available spectrodensitometer, the X-Rite 938 Spectrodensitometer (available from X-Rite, Inc. of Grandville, Mich.), using the appropriate calibration standards supplied by the X-Rite, Inc. For purposes of verifying and quantifying the overall colorimetric performance of the colored composition of the present invention, spectral data obtained by the spectrodensitometer was converted by the spectrodensitometer into various spectral values, including CIELAB L* (Lightness), a* (redness-greeness), b* (yellowness-blueness), $C^*_{ab}$ (Psychometric Chroma), and $h_{ab}$ (Psychometric P Hue Angle) values.

Before the reflectance spectra of the inventive colored compositions were evaluated, the X-Rite 938 Spectrodensitometer was calibrated to the appropriate calibration standard supplied by X-Rite, Inc. First, the spectrodensitometer was placed on the flat ceramic reflection standard. The reflectance spectra of the reflectance standard were determined after the target window of the spectrodensitometer was centered on the white circle of the reflectance standard and after making sure the spectrodensitometer was flat on and fully located on the reflectance standard. If necessary, appropriate adjustments were made to the spectrodensitometer in accordance with the manufacturer's instructions and the reflectance spectra of the reflectance standard were again determined to assure spectrodensitometer accuracy.

The reflectance spectra of the inventive colored compositions were evaluated using print samples of the colored composition, such as the hot melt ink, that were printed using an ink jet printer, such as the Lasermaster DisplayMaker ExPress printing unit. Before spectral data was obtained, the print samples were heated to fill gaps between print dots and make the print samples substantially uniform in thickness. Next, the X-Rite 938 Spectrodensitometer was placed on the print sample with the target window of the spectrodensitometer overlying the print sample and the spectrodensitometer fully located on and flat against the print sample. The spectrodensitometer was programmed to characterize spectral data in terms of L*, a* and b* and in terms of L*, $C^*_{ab}$ and $h_{ab}$. Determination of the L*, a*, and b* values and the L*, $C^*_{ab}$, and $h_{ab}$ values for a particular print sample entailed five separate measurements of spectral data at five separate locations on the print sample. Thus, the L*, a*, and b* values and the L*, $C^*_{ab}$, and $h_{ab}$ values are based on the average of twenty-five separate spectra measurements.

Measurement of Colored Composition Thickness

Unless otherwise stated, measurements of the thickness of the colored composition, such as the hot melt ink, were obtained with the aid of an Olympus Model SZH10 microscope with 10 × magnification. The Olympus Model SZH10 microscope is available from Olympus Corp. of America, Scientific Division, of New Hyde Park, N.Y. The Olympus Model SZH10 microscope has a measurement scale calibrated in microns. In preparation for making thickness measurements of printed and hand-coated samples of the colored composition, a knife cut was made through the sample of colored composition and through the substrate to which the colored composition was attached. The knife cut was made perpendicular to the major plane of the substrate. The thickness of the colored composition sample, adjacent the knife cut, was then determined visually using the Olympus Model SZH10 microscope and the calibrated measurement scale of the Olympus Model SZH10 microscope.

Adhesion to Substrate

Adhesion of the colored composition to the substrate and resistance of the colored composition, as applied to the substrate, to smearing was qualitatively determined by manually rubbing the colored composition after the colored composition was solidified. Adhesion was characterized as "good" if the applied colored composition was not separated from the substrate by the hand rubbing. Adhesion was characterized as "poor" if the colored composition substantially separated from the substrate and as "moderate" if only small amounts of the colored composition were detached from the substrate by the hand rubbing.

Likewise, smear resistance was characterized as "good" if hand rubbing caused no color to transfer from the colored composition to the rubbing hand. Also, the smear resistance was characterized as "poor" if substantial amounts of color were transferred from the colored composition to the rubbing hand and as "moderate" if only minor amounts of color transferred from the colored composition to the rubbing hand.

Water Resistance

Three potential water resistance tests were identified for the colored composition of the present invention. In the first water resistance test ("WR-1"), the colored composition, in the solid state, was soaked in water for a number of days or weeks. The results of the test were considered to be "good" if the water did not become colored, "poor" if the water became substantially colored, and "moderate" if the water only became slightly colored. The amount of ink used to test WR-1 was typically in the range of about 1 gram to about 10 grams and the amount of water used in the test was typically in the range of about 200 grams to about 500 grams. The water was maintained at ambient temperature.

Another water resistance test ("WR-2") involved pouring the colored composition, in the molten state, into the water. The results of the test were considered to be "good" if the water did not become colored, "poor" if the water became substantially colored, and "moderate" if the water only became slightly colored. The amount of ink used in test WR-2 was typically in the range of about 1 gram to about 5 grams and the amount of water used in the test was typically in the range of about 400 grams to about 500 grams. The water was maintained at ambient temperature.

A third test of water resistance ("WR-3") involved the colored composition as applied to the substrate, with the colored composition and substrate being soaked in water for a specified period of time, such as about a week. The results of this test were considered to be "good" if the colored composition remained on the substrate and the water did not pick up any color. The results of this test were considered to be "poor" if the ink substantially colored the water or if the colored composition became substantially dislodged from the paper. The results of this test were considered to be "moderate" if the ink only slightly colored the water or if the colored composition became only slightly separated from the substrate.

Thermal Stability

Thermal stability of the color concentrate and the colored composition were able to be determined using two different tests. In the first test, (S-1), the Brookfield viscosity (first viscosity measurement) was determined at a particular temperature and the sample was then poured into a mold and cooled to solidify the sample. The solid sample was then stored at ambient conditions below the melting point of the sample for a selected period of time. The sample was then remelted and the Brookfield viscosity (second viscosity measurement) was determined for a second time at the same temperature where the first viscosity measurement was made. Stability was considered to be "good" if the first viscosity measurement and the second viscosity measurement were the same. If the first viscosity measurement and the second viscosity measurement varied by more than 2.0 centipoise, the stability was defined as "poor", and if the difference between the first and second viscosity measurements was from 0.1 centipoise to 2.0 centipoise, the stability was defined as "moderate".

The second stability test (S-2) involved heating a sample of the color concentrate or of the colored composition to a particular temperature, such as 125° C. or 150° C., and holding the sample at that temperature for a selected period of time, such as 15 hours. The Brookfield viscosity of the sample was periodically measured at predetermined times during the 15 hour period. If the Brookfield viscosity remained constant throughout the test period, the thermal stability was characterized as "good". If the Brookfield viscosity changed by 2.0 centipoise or more during the test period, the thermal stability was defined as "poor". If the Brookfield viscosity varied more than 0.1 centipoise, but less than 2.0 centipoise, from the initial viscosity measurement, the thermal stability was characterized as "moderate".

Jetability

Jetability determinations were made using a conventional piezoelectric impulse type ink jet printer. Jetability incorporates various operational considerations and characteristics, including uniformity of colored composition melt, uniformity of colored composition flow in the molten state, nozzle-clogging characteristics of the colored composition, surface tension of the colored composition, colored composition droplet size on exiting the printer, and the shape the colored composition assumes on application to various substrates.

Jetability was considered to be "good" if the colored composition melted at a uniform rate without leaving partially melted or unmelted clumps; if the colored composition, in the molten state, flowed uniformly and formed uniform ink droplets on ejection from the printer nozzle; and if the molten colored composition did not clog or otherwise disrupt flow through the printer nozzle. If clogging of the nozzle did occur, it was an indication that dyes may have come out of solution or that pigment was agglomerated and non-uniformly dispersed in the colored composition. The jetability of the ink was considered to be "poor" and unacceptable if the colored composition did not uniformly melt, if the colored composition did not flow uniformly in the ink jet printer or if the molten colored composition disrupted uniform flow through the nozzle, such as by plugging of the nozzle.

Dot Circularity and Spreading

Another qualitative test concerned the circularity and spreading of ink dots 30, as in FIGS. 1 and 3, formed on the substrate 14 when the colored composition was applied to the substrate 14 using the ink jet printer 12. Dot circularity and spreading were determined qualitatively using the Olympus Model SZH10 microscope with 10 × magnification.

Circularity and spreading was characterized as "good" if dots formed by ink jet printing, were of substantially uniform circular shape, were well defined, were not off-center, and did not flow together with adjacent dots. Dot circularity and spreading were defined as "poor" if the dot formed by ink jet printing on the substrate was significantly non-uniform in circular dimension or shape, was poorly defined, was significantly off-center, or if the printed dot flowed together with adjacent dots.

EXAMPLES

The following examples are presented to describe color concentrates and colored compositions prepared in accordance with the present invention. The examples are presented for purposes of illustration only and are not to be construed as limiting the scope of the present invention.

EXAMPLE 1

This example demonstrates preparation of the color concentrate of the present invention where the concentrate is colored black. The resinous component of the color concentrate included 30 parts by weight (hereinafter "parts") of the Azamide® 2462 polyamide resin and 45 parts of the Unirez® 2224 polyamide resin. The Azamide® 2462 and the Unirez® 2224 polyamide resins which are each available as pellets or granules, were placed together in a mix vessel that included a conventional high shear mixer. The vessel was gradually heated to melt, warm to 125° C., and uniformly blend the polyamide resins.

Next, while maintaining the mixture temperature at 125° C., the first colorant blend agent and the plasticizer were gradually added to the vessel at approximately the same time and were mixed until melted and intimately blended with the resinous component. The first colorant blend agent consisted of 3 parts of the Aclyn® 293 ionomer and the plasticizer consisted of 2 parts of the Ketjenflex® 8 N-ethyl-toluenesulfonamide. Next, 20 parts of the Orasol® Black RLI dye was gradually added to the molten mixture and was mixed until the ingredients of the color concentrate were uniformly blended.

The Brookfield viscosity of the color concentrate was then determined with the Brookfield DV-III programmable rheometer, using spindle No. 18, and was found to be 270 centipoise at 150° C. The melting point of the color concentrate was found to be 75° C. The color concentrate was then poured into molds and solidified by cooling to room temperature. The concentrations of the various ingredients of the color concentrate of this example are listed in the following table:

TABLE 2

| Ingredients | Percent by Weight |
| --- | --- |
| Azamide ® 2462 polyamide resin | 30.0 |
| Unirez ® 2224 polyamide resin | 45.0 |
| Aclyn ® 293 ionomer | 3.0 |
| Ketjenflex ® 8 N-ethyl-toluene-sulfonamide | 2.0 |
| Orasol ® Black RLI dye | 20.0 |

EXAMPLE 2

This Example demonstrates preparation of the second portion of the colored composition of the present invention. The base component consisted of 35.71 parts of Kemamide® S stearamide and 57.14 parts of Kemamide® S-180 stearyl stearamide. The second portion was prepared by combining and melting the stearamide, the stearyl stearamide, and 7.15 parts of the plasticizer, Benzoflex® S-552 pentaerythritol benzoate, in a mixing vessel that included a conventional high shear mixer. The second portion was gradually heated to 125° C. and was constantly mixed until uniformly blended.

The Brookfield viscosity of the second portion was determined to be 3.54 centipoise at 150° C. using the Brookfield rheometer and spindle No. 18. The melting point was determined to be 85° C. The second portion was then poured into molds and solidified by cooling to room temperature. The concentrations of the various ingredients of the second portion of this example are summarized in the following table:

TABLE 3

| Ingredients | Percent by Weight |
| --- | --- |
| Kemamide ® S stearamide, | 35.71 |
| Kemamide ® S-180 stearyl stearamide | 57.14 |
| Benzoflex ® S-552 pentaerythritol benzoate | 7.15 |

EXAMPLE 3

This example demonstrates preparation of the colored composition, in the form of the hot melt ink, using color concentrate that was in solid form. To make the colored composition, 30 parts of the color concentrate made in Example 1, and broken into about ¼ inch chunks, and 70 parts of the second portion made in Example 2 were added to a heated mixing vessel, melted, and warmed to 125° C. The mixture of the color concentrate and the second portion was then heated to 125° C. and continuously stirred, until uniformly mixed, to make the hot melt ink.

The hot melt ink was then filtered by pouring the ink through a Tetko® Twill Dutch Weave stainless steel wire screen with a 450×2750 per inch mesh count and with openings sized between about 5 to about 7 microns. The Tetko® screen is available from Tetko, Inc. of Briarcliff Manor, N.Y. The filter was preheated to 125° C. beforehand to prevent the hot melt ink from solidifying on the screen. No material was retained on the screen, which demonstrates that the Orasol® Black RLI dye was fully dissolved in the hot melt ink.

The Brookfield viscosity of the hot melt ink was found to be 21.4 centipoise at 125° C., using spindle No. 18, and the melting point of the ink was determined to be 77° C. The hot melt ink was then poured into molds and allowed to solidify by cooling to room temperature. The concentrations of the various ingredients of the hot melt ink are presented in the following table:

TABLE 4

| Ingredients | Percent by Weight |
| --- | --- |
| Azamide ® 2462 polyamide resin | 9.0 |
| Unirez ® 2224 polyamide resin | 13.5 |
| Aclyn ® 293 ionomer | 0.9 |
| Ketjenflex ® 8 N-ethyl-toluene-sulfonamide | 0.6 |
| Orasol ® Black RLI dye | 6.0 |
| Kemamide ® S stearamide | 25.0 |
| Kemamide ® S-180 stearyl stearamide | 40.0 |
| Benzoflex ® S-552 pentaerythritol benzoate | 5.0 |

Various characteristics of the hot melt ink were examined. For example, melted samples of the hot melt ink were hand coated onto various types of substrates, such as sheets of xerographic paper and sheets of transparency material, to a substantially uniform thickness. The hot melt ink quickly solidified immediately on application to the respective substrates. No flaking or chipping of the solidified hot melt ink was observed.

The solidified hot melt ink samples attached to the xerographic paper and the transparency material were hand rubbed and determined to have both good adhesion and good smear resistance. Water resistance characteristics were determined using test WR-3 by soaking the substrates with the hand-coated ink in water at ambient temperature for more than two weeks. During the test period, the water resistance of the hot melt ink was found to be good since no bleeding of color from the hot melt ink into the water was observed and since the hot melt ink remained fully attached to the various substrates. The water resistance of the colored composition was also determined using test WR-1 by soaking the hot melt ink, in the solid state, in about 21° C. water for about four weeks. Again, the absence of color bleeding by the hot melt ink into the water demonstrated the good water resistance property of the inventive hot melt ink.

The thermal stability of the hot melt ink was demonstrated using the S-1 test, by heating a solidified sample of the hot melt ink to 150° C. and maintaining the hot melt ink at this temperature for 15 hours. The Brookfield viscosity of the hot melt ink at 150° C. was measured throughout the 15 hour period, including at the beginning and at the end of the period, using the Brookfield rheometer and spindle No. 18. The viscosity readings did not vary and therefore illustrate the good thermal stability of hot melt ink. Since no variation in the hot melt ink's viscosity was observed over time, this is also an excellent indicator that the hot melt ink has a good shelf life.

Samples of the hot melt ink were used in a large format ink jet printer, namely a Lasermaster DisplayMaker ExPress printing unit, to print dots on various substrates, including a sheet of clear and transparent polymeric material, a sheet of white and transparent material, and a sheet of white paper coated with clear and transparent polymeric material. The colored composition exhibited good jetability in the ink jet printer and resulted in no clogging whatsoever in the ink jet nozzle while printing the dots on the various substrates. The dots exhibited strong color intensity and good dot circularity, since the dots were of uniform circular shape when viewed under the Olympus SZH10 microscope.

Each of the printed samples were heated to about 90° C. for about 10 seconds with a conventional hair dryer to flatten and spread the dots in accordance with the method of the present invention and form uniform solid print regions. Each of these solid print regions exhibited very strong dark black images and, when manually rubbed by hand, exhibited good adhesion and smear resistance.

The optical density of the solid area was measured at various points using the Gretag D182 densitometer. The measured optical densities ranged from about 2.65 to about 3.25, depending upon the nature of the printed substrate.

COMPARATIVE EXAMPLE 1

This comparative example illustrates the limited solubility of dye when the ionomer is not included in the hot melt ink and where methods different from those of the present invention are followed. In this example, 30 parts of the Unirez® 2224 polyamide resin; 20 parts of the Kemamide® stearamide; 30 parts of Kemamide® P-181 oleyl pamitamide, and 20 parts of Polywax® 500 polyethylene wax were all combined together in a heated mix vessel.

After being melted, the polyamide resin, the stearamide, the oleyl pamitamide, and the polyethylene wax were heated in the mixing vessel to a temperature of about 125° C. and were continuously stirred until thoroughly blended. Next, 4 parts of the Orasol® Black RLI dye were gradually added to the mixing vessel and blended with the other ingredients using the mixer.

The composition of this ink, before taking into account undissolved dye, is presented in the following table:

TABLE 5

| Ingredients | Parts by Weight |
| --- | --- |
| Unirez® 2224 polyamide resin | 30.0 |
| Kemamide® S stearamide | 20.0 |
| Kemamide® P-181 oleyl pamitamide | 30.0 |
| Polywax® 500 polyethylene wax | 20.0 |
| Orasol® Black RLI dye | 4.0 |
| Thermoplast Yellow dye | 1.0 |

It was observed that a major portion of the dye was precipitated in the bottom of the mix vessel and had not dissolved in the other ingredients. Clearly, the concentration of dissolved dye was somewhat lower than the 5% amount listed in Table 5 above. The lack of dye solubility was especially enlightening since the dye was only present at a concentration of only about 5%, yet was still not fully soluble in the other ingredients.

The ink was then poured into molds and allowed to solidify by cooling to room temperature. The Brookfield viscosity of the ink was determined to be 16.7 centipoise at 125° C. using spindle No. 18. The melting point of the ink was determined to be 70° C.

EXAMPLE 4

This example demonstrates preparation of the color concentrate according to the same method used in Example 1, except that the color concentrate was maintained in the molten state, rather than being cooled and solidified. Also, the color concentrate had a different composition than used in Example 1. In this example, the resinous component of the color concentrate included 29.46 parts of the Azamide® 2462 polyamide resin and 44.18 parts of the Unirez® 2224 polyamide resin. Also, the first colorant blend agent consisted of 2.94 parts of the Aclyn® 293 ionomer, the plasticizer consisted of 2.06 parts of the Ketjenflex® 8 N-ethyl-toluene-sulfonamide, and the colorant consisted of 20.62 parts of the Orasol® Black RLI dye and 0.74 parts of Neopen Yellow 075 dye.

The concentrations of the ingredients of the color concentrate of this example are summarized in the following table:

TABLE 6

| Ingredients | Percent by Weight |
| --- | --- |
| Azamide® 2462 polyamide resin | 29.46 |
| Unirez® 2224 polyamide resin | 44.18 |
| Aclyn® 293 ionomer | 2.94 |
| Ketjenflex® 8 N-ethyl-toluene-sulfonamide | 2.06 |
| Orasol® Black RLI dye | 20.62 |
| Neopen Yellow 075 dye | 0.74 |

EXAMPLE 5

This example demonstrates preparation of the second portion according to the same method used in Example 2, except that the second portion was maintained in the molten state, rather than being solidified. Also, the second portion had a different composition than used in Example 2. In this example, the base component of the second portion included 29.85 parts of the Kemamide® stearamide, 40.3 parts of the Kemamide® P-181 oleyl palmitamide and 22.39 parts of the Polywax® 500 polyethylene wax. The second portion also included 7.46 parts of the Benzoflex® S-552 pentaerythritol benzoate.

The concentrations of the ingredients of the second portion of this example are summarized in the following table:

TABLE 7

| Ingredients | Percent by Weight |
| --- | --- |
| Kemamide® S stearamide | 29.85 |
| Kemamide® P-181 oleyl pamitamide | 40.30 |
| Benzoflex® S-552 pentaerythritol benzoate | 7.46 |
| Polywax® 500 polyethylene wax | 22.39 |

EXAMPLE 6

This example demonstrates preparation of the colored composition, in the form of the hot melt ink, by combining the color concentrate and the second portion while each are in the molten state, rather than in the solid state. In this example, the color concentrate of Example 4 and the second portion of Example 5 were prepared simultaneously in different vessels to minimize mixing time and introduction of air into the color concentrate and the second portion.

To make the colored composition, 33.25 parts of the molten color concentrate of Example 4 were added to 66.75 parts of the molten second portion of Example 5 in the mixing vessel. The molten hot melt ink was then heated to 125° C. and continuously mixed until uniformly mixed. The hot melt ink was then filtered through the preheated Tetko screen as described in Example 3. No material was retained on the screen, which demonstrates that the dye was fully dissolved in the hot melt ink.

The Brookfield viscosity of the hot melt ink was found to be 21.7 centipoise at 125° C. using the No. 18 spindle. Also, the melting point of the colored composition was determined to be 57° C. After measuring the melting point, the hot melt ink was poured into molds and allowed to solidify by cooling at room temperature. The composition of the hot melt ink of this example is presented in the following table:

TABLE 8

| Ingredients | Parts by Weight |
| --- | --- |
| Azamide ® 2462 polyamide resin | 10.0 |
| Unirez ® 2224 polyamide resin | 15.0 |
| Aclyn ® 293 ionomer | 1.0 |
| Ketjenflex ® 8 N-ethyl-toluene-sulfonamide | 0.7 |
| Orasol ® Black RLI dye | 7.0 |
| Neopen Yellow 075 dye | 0.3 |
| Kemamide ® S stearamide | 20.0 |
| Kemamide ® P-181 oleyl pamitamide | 27.0 |
| Benzoflex ® 552 pentaerythritol benzoate | 5.0 |
| Polywax ® 500 polyethylene wax | 15.0 |

Various characteristics of the hot melt ink were examined. For example, melted samples of the hot melt ink were hand coated on various types of substrates as described in Example 3. The hot melt ink immediately solidified on application to the respective substrates. No flaking or chipping of the solidified hot melt ink was observed.

Additionally, the adhesion, smear resistance and water resistance were tested as detailed in Example 3 with the results of this testing using the hot melt ink of Example 6 being virtually identical to the results obtained using these tests on the hot melt ink of Example 3. Additionally, the thermal stability of hot melt ink of this example was demonstrated using the S-1 test as described in Example 3. The steady viscosity readings that were observed amply illustrate the good thermal stability of the hot melt ink of Example 6. Since no variation in the hot melt ink's viscosity was observed over time, this is also an excellent indicator that the hot melt ink has a good shelf life.

EXAMPLE 7

This example demonstrates preparation of the hot melt ink using the method of Example 3, but with the composition of Example 6. The hot melt ink that resulted was determined to have a viscosity of 21.0 centipoise at 125° C. using the No. 18 spindle which is very close to the viscosity of the hot melt ink of Example 6, which was 21.7 centipoise at 125° C. The melting point of the hot melt ink of this example was 56° C. versus the 57° C. melting point of the Example 6 hot melt ink.

The hot melt ink was filtered through the preheated Tetko screen as described in Example 3. No material was retained on the screen, which demonstrates that the dye was fully dissolved in the hot melt ink. Furthermore, the hot melt ink, as hand coated and printed on various substrates as described in Example 3, showed virtually identical physical properties to those of the hot melt ink of Example 6. This test clearly indicates that cooling and solidification of the color concentrate of the present invention prior to use has essentially no effect on the properties and performance of the colored composition, such as the hot melt ink.

EXAMPLE 8

This example demonstrates preparation of the color concentrate with a colorant concentration of more than 16.2% colorant. The color concentrate was prepared according to the same method used in Example 4, except that the color concentrate had a different composition than used in Example 4. In this example, the resinous component included 26.14 parts of the Azamide® 2462 polyamide resin and 52.9 parts of the Unirez® 2224 polyamide resin. The first colorant blend agent consisted of 2.61 parts of the Aclyn® 293 ionomer; the antioxidant consisted of 1.31 parts of BHA; and the colorant consisted of 15.69 parts of the Orasol® Black RLI dye and 0.65 parts of the Neopen Yellow 075 dye. Also, 1.31 parts of Surfynol® 104 2,4,7,9-tetramethyl-5-decyne-4,7-diol were added to the resinous component at about the same time as the ionomer and the antioxidant. The colorant consisted of 15.69 parts of the Orasol® Black RLI dye and 0.65 parts of the Neopen Yellow 075 dye.

The concentrations of the ingredients of the color concentrate of this example are summarized in the following table:

TABLE 9

| Ingredients | Percent by Weight |
| --- | --- |
| Azamide ® 2462 polyamide resin | 26.14 |
| Unirez ® 2224 polyamide resin | 52.29 |
| Aclyn ® 293 ionomer | 2.61 |
| BHA | 1.31 |
| Surfynol ® 104 2,4,7,9-tetramethyl-5-decyne-4,7-diol | 1.31 |
| Orasol ® Black RLI dye | 15.69 |
| Neopen Yellow 075 dye | 0.65 |

EXAMPLE 9

This example demonstrates preparation of the second portion according to the same method described in Example 5, but with a different composition than used in Example 5. The second portion of this example also included the second colorant blend agent, the ultraviolet light inhibitor and the hindered amine additive.

In this example, the base component of the second portion included 21.74 parts of the Kemamide® S stearamide, 50.72 parts of the Kemamide® S-180 stearyl stearamide, and 21.74 parts of the Polywax® 500 polyethylene wax. Additionally, the second portion included 2.9 parts of the Tinuvin® 328 substituted benzotriazole as the ultraviolet light inhibitor; 1.45 parts of Tinuvin® 144 hindered amine additive; and 1.45 parts of the Aclyn® 293 ionomer as the second colorant blend agent. The ionomer, the substituted benzotriazole, and the hindered amine additive were added to the vessel at the same time as the stearamide, the stearyl stearamide, and the polyethylene wax.

The concentrations of the ingredients of the second portion of this example are summarized in the following table:

TABLE 10

| Ingredients | Percent by Weight |
| --- | --- |
| Kemamide ® S stearamide | 21.74 |
| Kemamide ® S-180 stearyl stearamide | 50.72 |
| Polywax ® 500 polyethylene wax | 21.74 |
| Aclyn ® 293 ionomer | 1.45 |
| Tinuvin ® 328 substituted benzotriazole | 2.90 |
| Tinuvin ® 144 hindered amine additive | 1.45 |

EXAMPLE 10

This example demonstrates preparation of the colored composition with the first and second colorant blend agents, in the form of the Aclyn® 293 ionomer, being split approximately 50%/50% between the color concentrate and the second portion. The colored composition, in the form of the hot melt ink, was prepared according to the same method described in Example 6, except that the hot melt ink had a different composition than used in Example 6. In this example, the hot melt ink included 38.25 parts of the molten color concentrate of Example 8 and 69 parts of the molten second portion of Example 9. The hot melt ink was filtered through the preheated Tetko screen as described in Example 3. No material was retained on the screen, which demonstrates that the dye was fully dissolved in the hot melt ink.

The Brookfield viscosity of the hot melt ink was found to be 25.5 centipoise at 125° C. using the No. 18 spindle. Also, the melting point of the colored composition was determined to be 75° C. The composition of the hot melt ink of this example is presented in the following table:

TABLE 11

| Ingredients | Parts by Weight |
| --- | --- |
| Azamide ® 2462 polyamide resin | 10.0 |
| Unirez ® 2224 polyamide resin | 20.0 |
| Aclyn ® 293 ionomer | 1.0 |
| BHA | 0.5 |
| Surfynol ® 104 2,4,7,9-tetramethyl-5-decyne-4,7-diol | 0.5 |
| Orasol ® Black RLI dye | 6.0 |
| Neopen Yellow 075 dye | 0.3 |
| Kemamide ® S stearamide | 15.0 |
| Kemamide ® S-180 stearyl stearamide | 35.0 |
| Polywax ® 500 polyethylene wax | 15.0 |
| Aclyn ® 293 ionomer | 1.0 |
| Tinuvin ® 328 substituted benzotriazole | 2.0 |
| Tinuvin ® 144 hindered amine additive | 1.0 |

EXAMPLE 11

This example demonstrates preparation of the color concentrate according to the same method described in Example 4, except with a different composition than used in Example 4. In this example, the resinous component included 82.9 parts of the Versamid® 759 polyamide resin. The first colorant blend agent consisted of 2.07 parts of the Aclyn® 293 ionomer. The color concentrate also included 1.04 parts of the BHA and 1.04 parts of the Surfynol® 104 2,4,7,9-tetramethyl-5-decyne-4,7-diol, which were gradually added along with the ionomer at about the same time to the molten polyamide resin. The colorant consisted of 12.43 parts of the Orasol® Black RLI dye and 0.52 parts of the Neopen Yellow 075.

The composition of the color concentrate of this example is summarized in the following table:

TABLE 12

| Ingredients | Parts by Weight |
| --- | --- |
| Versamid ® 759 polyamide resin | 82.90 |
| Aclyn ® 293 ionomer | 2.07 |
| BHA | 1.04 |
| Surfynol ® 104 2,4,7,9-tetramethyl-5-decyne-4,7-diol | 1.04 |
| Orasol ® black RLI dye | 12.32 |
| Neopen yellow 075 dye | 0.52 |

EXAMPLE 12

This example demonstrates preparation of the second portion according to the same method described in Example 5, but with a different composition than used in Example 5. In this example, the base component included 22.06 parts of the Kemamide® S stearamide, 51.47 parts of the Kemamide® S-180 stearyl stearamide, and 22.06 parts of the Polywax® 500 polyethylene wax. The second portion also included 2.94 parts of the Tinuvin® 328 substituted and 1.45 parts of the Tinuvin® 144 hindered amine additive. The Tinuvin® 328 substituted benzotriazole and the hindered amine additive were added to the vessel at the same time as the stearamide, the stearyl stearamide, and the polyethylene wax.

The concentrations of the ingredients of the second portion of this example are summarized in the following table:

TABLE 13

| Ingredients | Percent by Weight |
| --- | --- |
| Kemamide ® S stearamide | 22.06 |
| Kemamide ® S-180 stearyl stearamide | 51.47 |
| Polywax ® 500 polyethylene wax | 22.06 |
| Tinuvin ® 328 substituted benzotriazole | 2.94 |
| Tinuvin ® 144 hindered amine additive | 1.47 |

EXAMPLE 13

This example demonstrates preparation of the colored composition according to the same method described in Example 6, except that the colored composition of this example had a different composition than used in Example 6. The colored composition, in the form of the hot melt ink, included 48.25 parts of the color concentrate of Example 11 and 68 parts of the second portion of Example 12. The hot melt ink was filtered through the preheated Tetko screen as described in Example 3. No material was retained on the screen, which demonstrates that the dye was fully dissolved in the hot melt ink.

The Brookfield viscosity of the hot melt ink was found to be 22.1 centipoise at 125° C. using the No. 18 spindle. Also, the melting point of the hot melt ink was determined to be 71° C. The composition of the hot melt ink of this example is presented in the following table:

TABLE 14

| Ingredients | Parts by Weight |
| --- | --- |
| Versamid ® 759 polyamide resin | 40.0 |
| Aclyn ® 293 ionomer | 1.0 |
| BHA | 0.5 |
| Surfynol ® 104 2,4,7,9-tetramethyl-5-decyne-4,7-diol | 0.5 |
| Orasol ® Black RLI dye | 6.0 |
| Neopen Yellow 075 dye | 0.25 |
| Kemamide ® S stearamide | 15.0 |
| Kemamide ® S-180 stearyl stearamide | 35.0 |
| Polywax ® 500 polyethylene wax | 15.0 |
| Tinuvin ® 328 substituted benzotriazole | 2.0 |
| Tinuvin ® 144 hindered amine additive | 1.0 |

Various characteristics of the hot melt ink were examined. For example, melted samples of the hot melt ink were hand coated on various types of substrates as described in example 3. The hot melt ink immediately solidified on the respective substrates. No flaking or chipping of the solidified hot melt ink was observed.

Additionally, the adhesion, smear resistance, and water resistance were tested as described in Example 3, with the results of this test using the hot melt ink of Example 13 being virtually identical to the results obtained using these tests on the hot melt ink of Example 3. Additionally, the thermal stability of the hot melt ink of this example was demonstrated using the S-1 test as described in Example 3. The steady viscosity readings that were observed amply illustrate the good thermal stability of the hot melt ink of Example 13. Since no variation in the hot melt ink's viscosity was observed over time, this is also an excellent indicator that the hot melt ink has a good shelf life.

EXAMPLE 14

This example demonstrates preparation of a "colorless" concentrate according to the method used in Example 4, except with a different composition, including deletion of the colorant from the concentrate. In this example, the resinous component included 27.78 parts of the Azamide® 2462 polyamide resin and 55.56 parts of the Versamid® 759 polyamide resin. The concentrate also included 2.78 parts of the Aclyn® 293 ionomer, 1.39 parts of the BHA, 1.39 parts of the Surfynol® 104 2,4,7,9-tetramethyl-5-decyne-4,7-diol, and 5.55 parts of A-C® 540 ethylene acrylic acid copolymer, which served as a gloss enhancing agent. The ionomer, the BHA, the Surfynol® 104, and the A-C® 540 ethylene acrylic acid copolymer were gradually added at about the same time to the molten resinous component.

The composition of the "colorless" concentrate of this example is summarized in the following table:

TABLE 15

| Ingredients | Parts by Weight |
| --- | --- |
| Azamide ® 2462 polyamide resin | 27.78 |
| Versamid ® 759 polyamide resin | 55.56 |
| Aclyn ® 293 ionomer | 2.78 |
| A-C ® 540 ethylene acrylic acid copolymer | 5.55 |
| BHA | 1.39 |
| Surfynol ® 104 2,4,7,9-tetramethyl-5-decyne-4,7-diol | 1.39 |

EXAMPLE 15

This example demonstrates preparation of the second portion according to the method used in Example 5, but with a different composition from the compositions used in Example 5. In this example, the base component included 18.46 parts of the Kemamide® S stearamide, 61.54 parts of the Kemamide® S-180 stearyl stearamide, and 15.38 parts of the Polywax® 500. The second portion also included 3.08 parts of the Tinuvin® 328 substituted benzotriazole and 1.08 parts of the Tinuvin® 144 hindered amine additive.

The composition of the second portion of this example is summarized in the following table:

TABLE 16

| Ingredients | Parts by Weight |
| --- | --- |
| Kemamide ® S stearamide | 18.46 |
| Kemamide ® S-180 stearyl stearamide | 61.54 |
| Polywax ® 500 polyethylene wax | 15.38 |
| Tinuvin ® 328 substituted benzotriazole | 3.08 |
| Tinuvin ® 144 hindered amine additive | 1.08 |

COMPARATIVE EXAMPLE 2

This comparative example demonstrates preparation of a hot melt ink using the "colorless" concentrate of Example 14, the second portion of Example 15, and separately added dye, such as the Orasol® Black RLI dye. The hot melt ink was prepared by combining 36 parts of the molten "colorless" concentrate of Example 14 with 65 parts of the molten second portion of Example 15 in the mix vessel. The molten concentrate/second portion mixture was then heated to 125° C. and continuously stirred using the high shear mixer until uniformly mixed. Next, six parts of the Orasol® Black RLI dye were added to the concentrate/second portion mixture and continuously stirred in an attempt to obtain uniform mixture.

The Brookfield viscosity of the hot melt ink of this example was found to be 21 centipoise at 125° C. using the No. 18 spindle. Also, the melting point of the hot melt ink was determined to be 77° C. The composition of the hot melt ink of this example, before taking into account undissolved dye, is presented in the following table:

TABLE 17

| Ingredients | Parts by Weight |
| --- | --- |
| Azamide ® 2462 polyamide resin | 10.0 |
| Versamid ® 759 polyamide resin | 20.0 |
| Aclyn ® 293 ionomer | 1.0 |
| A-C ® 540 ethylene acrylic acid copolymer | 2.0 |
| BHA | 0.5 |
| Surfynol ® 104 2,4,7,9-tetramethyl-5-decyne-4,7-diol | 0.5 |
| Kemamide ® S stearamide | 12.0 |
| Kemamide ® S-180 stearyl stearamide | 40.0 |
| Polywax ® 500 polyethylene wax | 10.0 |
| Tinuvin ® 328 substituted benzotriazole | 2.0 |
| Tinuvin ® 144 hindered amine additive | 1.0 |
| Orasol ® Black RLI | 6.0 |

It was observed that a major portion of the Orasol® Black RLI dye was precipitated in the bottom of the mix vessel and had not dissolved in the other ingredients. Clearly, the concentration of dissolved Orasol® Black RLI dye was somewhat lower than the 6% amount exhibited in Table 17 above. The lack of dye solubility was especially enlightening since the dye was present at a concentration of only about 6%, yet was still not fully soluble in the other ingredients.

COMPARATIVE EXAMPLE 3

This comparative example illustrates the limited solubility of dye when the ionomer is not included in the colored composition and where methods different from those of the present invention are followed. In this example, 10 parts of Foral 105 glycerol ester of hydrogenated resin, 20 parts of Versamid® 759 polyamide resin, and 55 parts of Kemamide® U polyamide resin were all combined together in a heated mix vessel.

After being melted, the glycerol ester, the polyamide resin, and the oleamide were heated in the mixing vessel to a temperature of about 125° C. and were continuously stirred until thoroughly blended. Next, 20 parts of the Orasol® Black RLI dye were gradually added to the mix vessel and blended with the other ingredients using the mixer. The composition of this ink, before taking into account undissolved dye, is presented in the following table:

TABLE 18

| Ingredients | Parts by Weight |
| --- | --- |
| Foral 105 glycerol ester of hydrogenated resin | 10.0 |
| Versamid ® 759 polyamide resin | 20.0 |

TABLE 18-continued

| Ingredients | Parts by Weight |
| --- | --- |
| Orasol ® Black RLI dye | 20.0 |
| Kemamide ® U oleamide | 55.0 |

It was readily apparent that most of the Orasol® Black RLI dye did not dissolve in the other ingredients of this ink, since most of the dye precipitated to the bottom of the mixed vessel and did not actually blend with the other ingredients. The low concentration of dissolved dye in the ink was also evidenced by the weak color intensity of the black ink.

EXAMPLE 16

This example demonstrates preparation of the color concentrate according to the same method used in Example 4, except that the color concentrate had a different composition that used in Example 4. In this example, the resinous component of the color concentrate included 10 parts of the Foral 105 glycerol ester and 20 parts of the Versamid® 759 polyamide resin. The colorant consisted of 20 parts of the Orasol® Black RLI dye. The first colorant blend agent was not incorporated in the color concentrate of this example. The composition of the color concentrate of this example is summarized in the following table:

TABLE 19

| Ingredients | Parts by Weight |
| --- | --- |
| Foral 105 glycerol ester of hydrogenated resin | 10.0 |
| Versamid ® 759 polyamide resin | 20.0 |
| Orasol @ Black RLI dye | 20.0 |

EXAMPLE 17

This example demonstrates preparation of the colored composition according to the same method used in Example 6, but with a different composition than used in Example 6. In this example, the colored composition included the color concentrate of Example 16 and the second portion included 55 parts of molten Kemamide® U oleamide. With continuous mixing for about 30 minutes, complete solubility of the Orasol® Black RLI dye was attained in the colored composition, which took the form of the hot melt ink. The hot melt ink was filtered through the preheated Tetko screen as described in Example 3. No material was retained on the screen, which demonstrates that the dye was fully dissolved in the hot melt ink.

The composition of the hot melt ink of this example is presented in the following table:

TABLE 20

| Ingredients | Parts by Weight |
| --- | --- |
| Foral 105 glycerol ester of hydrogenated resin | 10.0 |
| Versamid ® 759 polyamide resin | 20.0 |
| Orasol @ Black RLI dye | 20.0 |
| Kemamide ® U oleamide | 55.0 |

EXAMPLE 18

This example demonstrates preparation of the color concentrate according to the same method used in Example 4. Additionally, the color concentrate of this example had the same composition as the color concentrate of Example 16, with the exception that this example included the first colorant blend agent in the form of 5.0 parts of the Aclyn® 293 ionomer. The composition of the color concentrate of this example is summarized in the following table:

TABLE 21

| Ingredients | Parts by Weight |
| --- | --- |
| Foral 105 glycerol ester of hydrogenated resin | 10.0 |
| Versamid ® 759 polyamide resin | 20.0 |
| Aclyn ® 293 ionomer | 5.0 |
| Orasol ® Black RLI dye | 20.0 |

EXAMPLE 19

This example demonstrates preparation of the colored composition according to the same method used in Example 4, but with a different composition. Specifically, the colored composition of this example, in the form of the hot melt ink, had the same composition as the hot melt ink of Example 17, except that the hot melt ink of this example included the Aclyn® 293 ionomer.

In this example, the color concentrate consisted of the color concentrate made in Example 18 and the second portion consisted of 55.0 parts of molten Kemamide® U. It was surprisingly discovered that the Orasol® Black RLI dye remained fully dissolved in the other ingredients of the hot melt ink of this example after only about 20 minutes of mixing, which is significantly less time than was required to fully blend the Orasol® Black RLI dye in the hot melt ink of Example 17. The hot melt ink of this example included the Aclyn® 293 ionomer, whereas the hot melt ink of Example 17 did not include the Aclyn® 293 ionomer.

The hot melt ink was filtered through the preheated Tetko screen as described in Example 3. The dye was fully dissolved in the hot melt ink since no material was retained on the screen and since no material precipitated to the bottom of the mix vessel. The composition of the hot melt ink of this example is presented in the following table:

TABLE 22

| Ingredients | Parts by Weight |
| --- | --- |
| Foral 105 glycerol ester of hydrogenated resin | 10.0 |
| Versamid ® 759 polyamide resin | 20.0 |
| Aclyn ® 293 ionomer | 5.0 |
| Orasol ® Black RLI dye | 20.0 |
| Kemamide ® U oleamide | 55.0 |

COMPARATIVE EXAMPLE 4

This comparative example illustrates the effect of the ionomer on dye solubility when the ionomer is included in the hot melt ink, but where methods different from those of the present invention are followed. The method of this comparative example was similar to the method of Comparative Example 3, with the exception that 5.0 parts of the Aclyn® 293 ionomer were combined with the Foral 105 glycerol ester, Versamid® 759 polyamide resin, and the Kemamide® U oleamide, and was well blended, before the 20 parts of the Orasol® Black RLI dye were added.

With this change, it was observed that the Orasol® Black RLI dye dissolved significantly better in the hot melt ink of this comparative example as compared to the hot melt ink of Comparative Example 3, since significantly less of the Orasol® Black RLI dye precipitated from the hot melt ink of this comparative example. However, the Orasol® Black RLI dye did not fully dissolve in this comparative example, whereas the Orasol® Black RLI dye did fully dissolve in the hot melt inks of Examples 17 and 19. The composition of the hot melt ink of this example, not accounting for precipitated Orasol® Black RLI dye, is summarized in the following table:

TABLE 23

| Ingredients | Parts by Weight |
| --- | --- |
| Foral 105 glycerol ester of hydrogenated resin | 10.0 |
| Versamid ® 759 polyamide resin | 20.0 |
| Aclyn ® 293 ionomer | 5.0 |
| Orasol ® Black RLI dye | 20.0 |
| Kemamide ® U oleamide | 55.0 |

EXAMPLE 20

This example demonstrates preparation of the color concentrate according to the same method used in Example 4, except with a different composition. In this example, the resinous component of the color concentrate consisted of 30 parts of the Versamid® 759 polyamide resin. The colorant consisted of 20.0 parts of the Orasol® Black RLI dye. The Versamid® 759 polyamide resin and the Orasol® Black RLI dye were the only ingredients of the color concentrate of this example.

EXAMPLE 21

This example demonstrates preparation of the second portion according to the same method used in Example 5, but with a different composition than used in Example 5. In this example, the base component of the second portion consisted of 40.0 parts of the Kemamide® U oleamide. Additionally, the second color blend agent, which consisted of 5.0 parts of the Aclyn® 290 ionomer, was included in the second portion. The Kemamide® U oleamide and the Aclyn® 290 ionomer were the only ingredients of the second portion.

EXAMPLE 22

This example demonstrates preparation of the colored composition according to the method used in Example 6, but with a different composition. The colored composition, in the form of the hot melt ink, included the color concentrate of Example 20 and the second portion of Example 21. The Orasol® Black RLI dye was fully dissolved in the hot melt ink of this example, as evidenced by the lack of any precipitation of Orasol® Black RLI dye from the ink after the color concentrate and the second portion were blended. Additionally, the hot melt ink was filtered through the preheated Tetko screen as described in Example 3. Since no material was retained on the screen and no material precipitated in the mix vessel, the dye was clearly dissolved fully in the hot melt ink.

The Brookfield viscosity of the hot melt ink was determined to be 45 centipoise at 150° C. using the No. 18 spindle. Also, the melting point of the colored composition was determined to be 50° C. The composition of the hot melt ink of this example is presented in the following table:

TABLE 24

| Ingredients | Parts by Weight |
| --- | --- |
| Versamid ® 759 polyamide resin | 30.0 |
| Orasol ® Black RLI dye | 20.0 |
| Kemamide ® U oleamide | 40.0 |
| Aclyn ® 290 ionomer | 5.0 |

The hot melt ink of this example was not able to be used in an ink jet printer since the viscosity of 45 centipoise at 150° C. made the hot melt ink excessively viscous for conventional ink jet printers.

EXAMPLE 23

This example demonstrates preparation of the color concentrate according to the method used in Example 4, but with a different composition. In this example, the resinous component of the color concentrate included 10 parts of the Foral 105 glycerol ester and 20 parts of the Versamid® 759 polyamide resin. Also, the first colorant blend agent consisted of 1 part of the Aclyn® 293 ionomer, and the colorant consisted of 15 parts of the Orasol® Black RLI dye. The composition of the color concentrate of this example is summarized in the following table:

TABLE 25

| Ingredients | Parts by Weight |
| --- | --- |
| Foral 105 glycerol ester of hydrogenated resin | 10.0 |
| Versamid ® 759 polyamide resin | 20.0 |
| Aclyn ® 293 ionomer | 1.0 |
| Orasol ® Black RLI dye | 15.0 |

EXAMPLE 24

This example demonstrates preparation of the colored composition according to the method used in example 4, but with a different composition. Specifically, the colored composition consisted of the color concentrate of Example 23 and 55 parts of molten Kemamide® U oleamide. The Kemamide® U oleamide served as the second portion of the colored composition.

The hot melt ink was filtered through the preheated Tetko screen as described in Example 3. No material was retained on the screen, which demonstrates that the dye was fully dissolved in the hot melt ink.

The Brookfield viscosity of the hot melt ink was determined to be 22.0 centipoise at 125° C. using the No. 18 spindle. The composition of the hot melt ink of this example is presented in the following table:

TABLE 26

| Ingredients | Parts by Weight |
| --- | --- |
| Foral 105 glycerol ester of hydrogenated resin | 10.0 |
| Versamid ® 759 polyamide resin | 20.0 |
| Aclyn ® 293 ionomer | 1.0 |
| Orasol ® Black RLI dye | 15.0 |
| Kemamide ® U oleamide | 55.0 |

COMPARATIVE EXAMPLE 5

This comparative example demonstrates the decreased solubility of dye in hot melt ink where methods different from those of the present invention are followed. In this example, 10 parts of the Foral 105 glycerol ester, 20 parts of the Versamid® 759 polyamide resin, 55 parts of the Kemamide® U oleamide, and 1 part of the Aclyn® 293 ionomer were combined together in a heated mix vessel, melted together, and thoroughly blended together at a temperature of about 125° C. Next, 15 parts of the Orasol® Black RLI dye were gradually added to the mixed vessel and blended with the other ingredients. The composition of the resultant ink, before accounting for precipitation of the dye, is presented in the following table:

TABLE 27

| Ingredients | Parts by Weight |
|---|---|
| Foral 105 glycerol ester of hydrogenated resin | 10.0 |
| Versamid® 759 polyamide resin | 20.0 |
| Aclyn® 293 ionomer | 1.0 |
| Orasol® Black RLI dye | 15.0 |
| Kemamide® U oleamide | 55.0 |

It was observed that a major portion of the Orasol® Black RLI dye precipitated from the ink after being blended with the other ingredients. Clearly, the concentration of dissolved Orasol® Black RLI dye was substantially lower in this comparative example than in Example 24. The ingredients of the Example 24 hot melt ink and the ink of this comparative example were identical. The sole difference between the hot melt ink of Example 24 and the hot melt ink of this comparative example was that the hot melt ink of Example 24 was made by the inventive method, whereas the hot melt ink of this comparative example was not.

EXAMPLE 25

This example demonstrates preparation of the color concentrate according to the method used in Example 4, but with a different composition. Specifically, this example demonstrates preparation of the color concentrate using the same ingredients as the color concentrate of Example 23, but with a significantly higher concentration of the Orasol® Black RLI dye. In this example, the resinous component of the color concentrate included 10 parts of the Foral 105 glycerol ester and 20 parts of the Versamid® 759 polyamide resin. Also, the first colorant blend agent consisted of 1 part of the Aclyn® 293 ionomer, and the colorant consisted of 20 parts of the Orasol® Black RLI dye. The composition of the color concentrate of this example is summarized in the following table:

TABLE 28

| Ingredients | Parts by Weight |
|---|---|
| Foral 105 glycerol ester of hydrogenated resin | 10.0 |
| Versamid® 759 polyamide resin | 20.0 |
| Aclyn® 293 ionomer | 1.0 |
| Orasol® Black RLI dye | 20.0 |

EXAMPLE 26

This example demonstrates preparation of the colored composition according to the method used in Example 6, but with a different composition. The ingredients of the hot melt ink of this example were the same as the ingredients of the hot melt ink of Example 24, but the concentration of the Orasol® Black RLI dye was significantly higher in the colored composition of this example as compared to the hot melt ink of Example 24. Specifically, the colored composition of this example, in the form of the hot melt ink, included the colored composition of Example 25 and 50 parts of the Kemamide® U oleamide. The Kemamide® U oleamide served as the second portion of the colored composition.

The hot melt ink was filtered through the preheated Tetko screen as described in Example 3. No material was retained on the screen, which demonstrates that the dye was fully dissolved in the hot melt ink. The Brookfield viscosity of the hot melt ink was determined to be 26.8 centipoise at 125° C. using the No. 18 spindle. The composition of the hot melt ink of this example is presented in the following table:

TABLE 29

| Ingredients | Parts by Weight |
|---|---|
| Foral 105 glycerol ester of hydrogenated resin | 10.0 |
| Versamid® 759 polyamide resin | 20.0 |
| Aclyn® 293 ionomer | 1.0 |
| Orasol® Black RLI dye | 20.0 |
| Kemamide® U oleamide | 50.0 |

Surprisingly, even though the hot melt ink had a dye concentration of nearly 20%, the viscosity of the hot melt ink of this example was in the range of acceptable viscosities for hot melt inks used in conventional ink jet printers.

EXAMPLE 27

This example demonstrates preparation of the color concentrate according to the method used in Example 4, but with a different composition than the colored concentrate of Example 4. In this example, the resinous component of the color concentrate included 10 parts of the Azamide® 2462 polyamide resin and 20 parts of the Unirez® 2224 polyamide resin. The first colorant blend agent consisted of one pan of the Aclyn® 293 ionomer. Also, the color concentrate included 0.5 parts of the Surfynol® surfactant, 0.5 parts of the Irganox® 1010 antioxidant and thermal stabilizer, and 2 parts of the A-C® 540 ethylene acrylic acid copolymer, each of which were added to the resinous component at about the same time as the Aclyn® 293 ionomer.

The composition of the color concentrate of this example is summarized in the following table:

TABLE 30

| Ingredients | Parts by Weight |
|---|---|
| Azamide® 2462 polyamide resin | 10 |
| Unirez® 2224 polyamide resin | 20 |
| Aclyn® 293 ionomer | 1 |
| Surfynol® 104 2,4,7,9-tetramethyl-5-decyne-4,7-diol | 0.5 |
| Irganox® 1010 antioxidant | 0.5 |
| A-C® 540 ethylene acrylic acid | 2 |
| Orasol® Blue GN dye | 2 |

COMPARATIVE EXAMPLE 6

This comparative example, in combination with Examples 29, 30, 32, and 33 which follow, demonstrates the impact of the ionomer of the first and/or second colorant blend agent on dye solubility in the second portion of the colored composition and on uniformity of dye concentration within the colored composition. Also, in combination with Example 44, this comparative example demonstrates the diminished homogenenizing effect, of low ionomer concentrations on the order of about 1%, on the color concentrate and the second portion, as the relative difference in polarity between the resinous component and the base component increases.

In this comparative example, the color concentrate of Example 27 and 65 parts of the Polywax® 500 polyethylene wax, with the color concentrate and the Polywax® 500 both molten, were combined together, heated to a temperature of about 125° C., and thoroughly blended in a heated mix vessel. The composition of the resultant ink is presented in the following table:

TABLE 31

| Ingredients | Parts by Weight |
| --- | --- |
| Azamide ® 2462 polyamide resin | 10 |
| Unirez ® 2224 polyamide resin | 20 |
| Aclyn ® 293 ionomer | 1 |
| Surfynol ® 104 2,4,7,9-tetramethyl-5-decyne-4,7-diol | 0.5 |
| Irganox ® 1010 antioxidant | 0.5 |
| A-C ® 540 ethylene acrylic acid | 2 |
| Orasol ® Blue GN dye | 2 |
| Polywax ® 500 polyethylene wax | 65 |

This comparative example clearly demonstrates the non-compatibility of the color concentrate and the second portion of the ink where a low concentration of ionomer on the order of about 1% and a high concentration, on the order of about 65%, of substantially non-polar material are present. Specifically, after the ink was cooled and solidified, the color concentrate and the second portion were clearly separated into two distinct layers. The top layer, predominantly composed of the Polywax® 500 of the second portion, had a very pale Cyan color. The pale Cyan color evidenced the very low solubility of the somewhat polar Orasol® Blue GN dye in the substantially non-polar Polywax® 500 for the ink with the composition of this comparative example. The color concentrate made up the bottom layer, which had a very dark blue color indicative of the high solubility of the Orasol® Blue GN dye in the polar resinous component of the color concentrate.

EXAMPLE 28

This example demonstrates preparation of the color concentrate according to the same method used in Example 27 and with the same composition as in Example 27, except for the Irganox® 1010 antioxidant, which was left out of the color concentrate of this example. The composition of the color concentrate of this example is summarized in the following table:

TABLE 32

| Ingredients | Parts by Weight |
| --- | --- |
| Azamide ® 2462 polyamide resin | 10 |
| Unirez ® 2224 polyamide resin | 20 |
| Aclyn ® 293 ionomer | 1 |
| Surfynol ® 104 2,4,7,9-tetramethyl-5-decyne-4,7-diol | 0.5 |
| A-C ® 540 ethylene acrylic acid | 2 |
| Orasol ® Blue GN dye | 2 |

EXAMPLE 29

This example demonstrates preparation of the colored composition according to the same method used in Example 6, but with a different composition. More specifically, the composition of the present colored composition was the stone as the colored composition of Comparative Example 6, with the exception that 15 parts of the Aclyn® 293 ionomer were substituted in place of 15 parts of the Polywax® 500 polyethylene wax. The second portion of the colored composition comprised a molten mixture consisting of 50 parts of the Polywax® 500 polyethylene wax and 15 parts of the Aclyn® 293 ionomer. The color concentrate, in the form of the hot melt ink, consisted of the color concentrate of Example 28 and the second portion made in accordance with this example.

The dye was fully dissolved in the colored composition, as evidenced by the observation that no dye precipitated in the mix vessel after blending of the color concentrate and the second portion. The composition of the hot melt ink of this example is presented in the following table:

TABLE 33

| Ingredients | Parts by Weight |
| --- | --- |
| Azamide ® 2462 polyamide resin | 10 |
| Unirez ® 2224 polyamide resin | 20 |
| Aclyn ® 293 ionomer | 1 |
| Surfynol ® 104 2,4,7,9-tetramethyl-5-decyne-4,7-diol | 0.5 |
| A-C ® 540 ethylene acrylic acid | 2 |
| Orasol ® Blue GN dye | 2 |
| Polywax ® 500 polyethylene wax | 50 |
| Aclyn ® 293 ionomer | 15 |

In the cooled and solidified hot melt ink of this example, the Orasol® Blue GN dye was uniformly distributed between the second portion and the color concentrate. Additionally, despite the relatively high concentration of Polywax® 500 polyethylene wax on the order of about 50%, the second portion and the color concentrate were substantially compatible with each other. A major layer of deep and uniform blue color was observed in the solidified hot melt ink, as compared to the two distinct layers of Comparative Example 6. Only minor non-compatibility of the second portion and the color concentrate was observed. Specifically, the periphery of the meniscus formed on solidification of the hot melt ink of this example in the mold had a small area with a light cyan color, as compared to the deep and uniform color observed in the major layer. The volume of the ink with the light cyan color was substantially less than 1% of the total ink volume.

EXAMPLE 30

This example demonstrates preparation of the colored composition according to the method used in Examples 6 and 29, and with the same composition as in Example 29, with the exception that the Aclyn® 293 ionomer of the second component was replaced by the Aclyn® 290 ionomer, which has a higher acid number than does the Aclyn® 293 ionomer.

The dye was fully dissolved in the colored composition, as evidenced by the observation that no dye precipitated in the mix vessel after blending of the color concentrate and the second portion. The composition of the hot melt ink of this example is presented in the following table:

TABLE 34

| Ingredients | Parts by Weight |
| --- | --- |
| Azamide ® 2462 polyamide resin | 10 |
| Unirez ® 2224 polyamide resin | 20 |
| Aclyn ® 290 ionomer | 1 |
| Surfynol ® 104 2,4,7,9-tetramethyl-5-decyne-4,7- | 0.5 |

TABLE 34-continued

| Ingredients | Parts by Weight |
| --- | --- |
| diol | |
| A-C ® 540 ethylene acrylic acid | 2 |
| Orasol ® Blue GN dye | 2 |
| Polywax ® 500 polyethylene wax | 50 |
| Aclyn ® 290 ionomer | 15 |

In this example, the Orasol® Blue GN dye was much more uniformly distributed between the color concentrate and the second portion than in the ink of Comparative Example 6. Specifically, in the cooled and solidified hot melt ink of this example, the Orasol® Blue GN dye was almost as uniformly distributed between the second portion and the color concentrate as in the cooled and solidified hot melt ink of Example 29. A major layer of deep and uniform blue color was observed in the solidified hot melt ink, as compared to the two distinct layers of Comparative Example 6. However, the periphery of the meniscus formed on solidification of the hot melt ink of this example in the mold had a slightly larger area with a light cyan color, as compared to the meniscus periphery of the Example 29 hot melt ink. Nevertheless, the volume of the ink with the light cyan color was still substantially less than 1% of the total ink volume.

It is believed that the higher acid number of the Aclyn® 290 ionomer, as compared to the Aclyn® 293 ionomer, substantially contributed to the decreased color concentrate/second portion compatibility and the decreased uniformity of dye distribution, as compared to the hot melt ink of Example 29.

EXAMPLE 31

This example demonstrates preparation of the color concentrate according to the method used in Examples 4 and 28, and with the same composition as the color concentrate of Example 28, with the exception that the first colorant blend agent was increased to 16 parts of the Aclyn® 293 ionomer. The composition of the color concentrate of this example is summarized in the following table:

TABLE 35

| Ingredients | Parts by Weight |
| --- | --- |
| Azamide ® 2462 polyamide resin | 10 |
| Unirez ® 2224 polyamide resin | 20 |
| Aclyn ® 293 ionomer | 16 |
| Surfynol ® 104 2,4,7,9-tetramethyl-5-decyne-4,7-diol | 0.5 |
| A-C ® 540 ethylene acrylic acid | 2 |
| Orasol ® Blue GN dye | 2 |

EXAMPLE 32

This example demonstrates preparation of the colored composition according to the method used in Examples 6 and 29, with the exception that the second portion only included the 50 parts of the Polywax® 500 polyethylene wax and did not include the 15 parts of the Aclyn® 293 ionomer, which were instead included in the color concentrate as stated in Example 31.

The dye was fully dissolved in the colored composition, as evidenced by the observation that no dye precipitated in the mix vessel after blending of the color concentrate and the second portion. The composition of the hot melt ink of this example is presented in the following table:

TABLE 36

| Ingredients | Parts by Weight |
| --- | --- |
| Azamide ® 2462 polyamide resin | 10 |
| Unirez ® 2224 polyamide resin | 20 |
| Aclyn ® 293 ionomer | 16 |
| Surfynol ® 104 2,4,7,9-tetramethyl-5-decyne-4,7-diol | 0.5 |
| A-C ® 540 ethylene acrylic acid | 2 |
| Orasol ® Blue GN dye | 2 |
| Polywax ® 500 polyethylene wax | 50 |

This example demonstrates that incorporation of the 15 parts of Aclyn® 293 in the color concentrate, rather than in the second portion, does not substantially change the compatibility of the second portion and the color concentrate and does not substantially effect color distribution uniformity, since the color distribution uniformity in the hot melt ink was only slightly diminished as compared to the hot melt ink of Example 29.

EXAMPLE 33

This example demonstrates preparation of the color concentrate according to the method used in Examples 4 and 31, but with the amount of Aclyn® 293 ionomer increased to 33 parts, instead of the 16 parts expressed in Example 31. The composition of the color concentrate of this example is presented in the following table:

TABLE 37

| Ingredients | Parts by Weight |
| --- | --- |
| Azamide ® 2462 polyamide resin | 10 |
| Unirez ® 2224 polyamide resin | 20 |
| Aclyn ® 293 ionomer | 33 |
| Surfynol ® 104 2,4,7,9-tetramethyl-5-decyne-4,7-diol | 0.5 |
| A-C ® 540 ethylene acrylic acid | 2 |
| Orasol ® Blue GN dye | 2 |

EXAMPLE 34

This example demonstrates preparation of the colored composition according to the method used in Examples 6 and 32, but with the Aclyn® 293 ionomer increased to 33 parts in the color concentrate and with the Polywax® 500 polyethylene wax decreased to 33 parts in the second portion.

The dye was fully dissolved in the colored composition, as evidenced by the observation that no dye precipitated in the mix vessel after blending of the color concentrate and the second portion. The composition of the hot melt ink of this example is presented in the following table:

TABLE 38

| Ingredients | Parts by Weight |
| --- | --- |
| Azamide ® 2462 polyamide resin | 10 |
| Unirez ® 2224 polyamide resin | 20 |
| Aclyn ® 293 ionomer | 33 |
| Surfynol ® 104 2,4,7,9-tetramethyl-5-decyne-4,7-diol | 0.5 |
| A-C ® 540 ethylene acrylic acid | 2 |
| Orasol ® Blue GN dye | 2 |
| Polywax ® 500 polyethylene wax | 33 |

In this example, the Orasol® Blue GN dye was much more uniformly distributed between the color concentrate and the second portion than in the ink of Comparative Example 6. A single, uniform deep cyan color was observed in the cooled and solidified hot melt ink of this example. Clearly, the Orasol® Blue GN dye was uniformly distributed between the second portion and the color concentrate since the entire periphery of the meniscus formed on solidification of the hot melt ink of this example in the mold had the uniform deep cyan color. No light cyan color, such as observed in the upper layer of comparative example 6 or in the meniscus periphery of Examples 29, 30, and 32, was discernable.

EXAMPLE 35

This example demonstrates preparation of the color concentrate according to the method used in Example 4, but with a different composition and with pigment substituted in place of the dye. In this example, the resinous component of the color concentrate consisted of 30 parts of the Versamid® 759 polyamide resin and the colorant consisted of 5 parts of the Regal 350R Carbon Black. Additionally, the first colorant blend agent was not included in the color concentrate of this example.

The Versamid® 759 polyamide resin was first melted and the Carbon Black pigment was then thoroughly blended in the Versamid® 759 polyamide resin. The composition of the color concentrate of this example is summarized in the following table:

TABLE 39

| Ingredients | Parts by Weight |
|---|---|
| Versamid ® 759 polyamide resin | 30 |
| Regal 350R Carbon Black | 5 |

EXAMPLE 36

This example demonstrates preparation of the colored composition with pigment substituted for the dye. The colored composition was prepared according to the method used in Example 6. The colored composition consisted of the color concentrate of Example 35 and 65 parts of molten Kemamide® U oleamide. The Kemamide® U oleamide served as the second portion of the colored composition.

The carbon black was not agglomerated and was well dispersed in the hot melt ink, as evidenced by the observation that no carbon black precipitated in the mix vessel after blending of the color concentrate and the second portion. The Brookfield viscosity of the hot melt ink was determined to be 17.3 centipoise at 125° C. using the No. 18 spindle. Also, the melting point of the colored composition was determined to be 64° C. The composition of the hot melt ink of this example is presented in the following table:

TABLE 40

| Ingredients | Parts by Weight |
|---|---|
| Versamid ® 759 polyamide resin | 30 |
| Regal 350R Carbon Black | 5 |
| Kemamide ® U oleamide | 65 |

The Carbon Black was not agglomerated in the ink, did not precipitate from the ink, and was distributed throughout the ink, but was not uniformly distributed within the ink.

EXAMPLE 37

This example demonstrates preparation of the color concentrate according to the method used in Example 35, but with two parts of Aclyn® 290 ionomer melted and blended with the molten Versamid® 759 polyamide resin, prior to addition of the Regal 350R Carbon Black. The composition of the color concentrate of this example is summarized in the following table:

TABLE 41

| Ingredients | Parts by Weight |
|---|---|
| Versamid ® 759 polyamide resin | 30 |
| Aclyn ® 290 ionomer | 2 |
| Regal 350R Carbon Black | 5 |

EXAMPLE 38

This example demonstrates preparation of the colored composition according to the method used in Example 36, but with the Aclyn® 290 ionomer included in the color concentrate. Specifically, the colored composition of this example consisted of the color concentrate of Example 37 and 63 parts of the molten Kemamide® U oleamide. The Kemamide® U oleamide served as the second portion of the colored composition.

The hot melt ink was filtered through the preheated Tetko screen as described in Example 3. No material was retained on the screen, which demonstrates that the Carbon Black was not agglomerated in the ink and was well dispersed in the hot melt ink. The Brookfield viscosity of the hot melt ink was determined to be 15.8 centipoise at 125° C. using the No. 18 spindle. Also, the melting point of the colored composition was determined to be 62° C. The concentrations of the ingredients of the hot melt ink of this example are presented in the following table:

TABLE 42

| Ingredients | Percentage by Weight |
|---|---|
| Versamid ® 759 polyamide resin | 30 |
| Aclyn ® 290 ionomer | 2 |
| Regal 350R Carbon Black | 5 |
| Kemamide ® U oleamide | 63 |

The black color of the Carbon Black was much more uniform in the hot melt ink of this example than in the hot melt ink of Example 36. Indeed, the Carbon Black distribution was very uniform since no color differences were discernable in the hot melt ink of this example.

EXAMPLE 39

This example demonstrates preparation of the color concentrate according to the method used in Example 4, except with a different composition than used in Example 4. In this example, the resinous component of the color concentrate included 10 parts of the Azamide® 2462 polyamide resin and 20 parts of the Versamid® 759 polyamide resin. The color concentrate also included 1 part of the Aclyn® 293 ionomer as the first colorant blend agent, 1 part of the A-C® 540 ethylene acrylic acid copolymer, and 0.5 parts of the Irganox® 1010 antioxidant, each of which were added at about the same time to the molten resinous component. The colorant consisted of 6.0 parts of the Orasol® Black RLI dye and 0.3 parts of the Neopen Yellow 075 dye. The composition of the color concentrate of this example is summarized in the following table:

TABLE 43

| Ingredients | Parts by Weight |
| --- | --- |
| Azamide ® 2462 polyamide resin | 10.0 |
| Versamid ® 759 polyamide resin | 20.0 |
| Aclyn ® ionomer | 1.0 |
| A-C ® 540 ethylene acrylic acid copolymer | 1.0 |
| Irganox ® 1010 antioxidant | 0.5 |
| Orasol ® Black RLI dye | 6.0 |
| Neopen Yellow 075 dye | 0.3 |

EXAMPLE 40

This example demonstrates preparation of the second portion of the colored composition according to the method used in Example 5, except with a different composition than used in Example 5. In this example, the base component of the second portion included 12.0 parts of the Kemamide® S stearamide, 45.6 parts of the Kemamide® S-180 stearyl stearamide, and 12.0 parts of the Polywax® 500 polyethylene wax. The second portion also included 2.0 parts of the Tinuvin® 328 substituted benzotriazole and 1.0 part of the Tinuvin® 144 hindered amine additive. The composition of the second portion of this example is summarized in the following table:

TABLE 44

| Ingredients | Parts by Weight |
| --- | --- |
| Kemamide ® S stearamide | 12.0 |
| Kemamide ® S-180 stearyl stearamide | 45.6 |
| Polywax ® 500 polyethylene wax | 12.0 |
| Tinuvin ® 328 substituted benzotriazole | 2.0 |
| Tinuvin ® 144 hindered amine additive | 1.0 |

EXAMPLE 41

This example demonstrates preparation of the colored composition according to the method used in Example 6. In this example, the colored composition consisted of the color concentrate of Example 39 and the second portion of Example 40.

The hot melt ink was filtered through the preheated Tetko screen as described in Example 3. No material was retained on the screen, which demonstrates that the dye was fully dissolved in the hot melt ink. The Brookfield viscosity of the hot melt ink was determined to be 23.3 centipoise at 25° C. using the No. 18 spindle. Also, the melting point of the colored composition was determined to be 78° C. The composition of the hot melt ink of this example is presented in the following table:

TABLE 45

| Ingredients | Parts by Weight |
| --- | --- |
| Azamide ® 2462 polyamide resin | 10.0 |
| Versamid ® 759 polyamide resin | 20.0 |
| Aclyn ® ionomer | 1.0 |
| A-C ® 540 ethylene acrylic acid copolymer | 1.0 |
| Irganox ® 1010 antioxidant | 0.5 |
| Orasol ® Black RLI dye | 6.0 |
| Neopen Yellow 075 dye | 0.3 |
| Kemamide ® S stearamide | 12.0 |
| Kemamide ® S-180 stearyl stearamide | 45.6 |
| Polywax ® 500 polyethylene wax | 12.0 |

TABLE 45-continued

| Ingredients | Parts by Weight |
| --- | --- |
| Tinuvin ® 328 substituted benzotriazole | 2.0 |
| Tinuvin ® 144 hindered amine additive | 1.0 |

Samples of the hot melt ink were used in a large format ink jet printer, namely the Lasermaster DisplayMaker ExPress printing unit, to print dots on various substrates, including a sheet of clear and transparent polymeric material, a sheet of white and transparent material, and a sheet of white paper coated with clear and transparent polymeric material. The colored composition exhibited good jetability in the ink jet printer and resulted in no clogging whatsoever in the ink jet nozzle while printing the dots on the various printed substrates. The dots exhibited strong color intensity and good dot circularity, since the dots were of uniform circular shape when viewed under the Olympus SZH10 microscope.

Each of the printed substrates were heated to about 90° C. for about 10 seconds with a conventional hair dryer to flatten and spread the dots in accordance with the method of the present invention and form uniform solid print regions. Each of these solid print regions exhibited strong intensity black images and, when manually rubbed by hand, exhibited good adhesion and smear resistance.

After heating the printed substrates, the reflectance spectra for the colored composition of this example, as printed on the various substrates, was evaluated using the X-Rite 938 spectrodensitometer. The reflectance spectra for the colored composition that was printed on the clear and transparent polymeric material were as follows: $L^*=4.03$; $a^*=3.43$; $b^*=-1.28$; $C^*_{ab}=3.67$; $h_{ab}=339.54$. Additionally, the optical density of the colored composition that was printed on the clear and transparent polymeric material was measured, using the Gretag Model No. D182 densitometer, to be 3.16. The reflectance spectra for the colored composition that was printed on the white and transparent polymeric material are as follows: $L^*=9.11$; $a^*=1.51$; $b^*=-0.58$; $C^*_{ab}=1.61$; $h_{ab}=338.99$. The reflectance spectra for the colored composition that was printed on the white paper coated with clear and transparent polymeric material are as follows: $L^*=8.37$; $a^*=1.79$; $b^*=-0.50$; $C^*_{ab}=1.85$; $h_{ab}=344.40$. For the clear and transparent polymeric material, the white and transparent polymeric material, and the white paper coated with clear and transparent polymeric material, the thickness of the colored composition where the reflectance spectra and optical density were measured was about 20 microns.

EXAMPLE 42

This example demonstrates preparation of the color concentrate according to the method used in Example 4, except with a different composition than used in Example 4. In this example, the resinous component of the color concentrate included 10.0 parts of the Azamide® 2462 polyamide resin and 20.0 parts of the Versamid® 759 polyamide resin. Also, the color concentrate included 1.0 part of the Aclyn® 293 ionomer, 0.5 parts of the Irganox® 1010 antioxidant, 0.5 parts of the BHA, and 2.0 parts of the A-C® 540 ethylene acrylic acid copolymer, each of which were added at about the same time to the molten resinous component. The colorant consisted of 2.0 parts of the Orasol® Yellow 4GN dye. The composition of the color concentrate of this example is summarized in the following table:

TABLE 46

| Ingredients | Parts by Weight |
| --- | --- |
| Azamide ® 2462 polyamide resin | 10.0 |
| Versamid ® 759 polyamide resin | 20.0 |
| Aclyn ® 293 ionomer | 1.0 |
| Irganox ® 1010 antioxidant | 0.5 |
| BHA | 0.5 |
| A-C ® 540 ethylene acrylic acid copolymer | 2.0 |
| Orasol ® Yellow 4GN | 2.0 |

EXAMPLE 43

This example demonstrates preparation of the second portion according to the method used in Example 5. In this example, the base component of the second portion included 12.0 parts of the Kemamide® S stearamide, 40.0 parts of the Kemamide® S-180 stearyl stearamide, and 10.0 parts of the Polywax® 500 polyethylene wax. The second portion also included 2.0 parts of the Tinuvin® 328 substituted benzotriazole and 1.0 part of the Tinuvin® 144 hindered amine additive. The composition of the second portion of this example is summarized in the following table:

TABLE 47

| Ingredients | Parts by Weight |
| --- | --- |
| Kemamide ® S stearamide | 12.0 |
| Kemamide ® S-180 stearyl stearamide | 40.0 |
| Polywax ® 500 polyethylene wax | 10.0 |
| Tinuvin ® 328 substituted benzotriazole | 2.0 |
| Tinuvin ® 144 hindered amine additive | 1.0 |

EXAMPLE 44

This example demonstrates the impact of the base component polarity on dye solubility in the second portion of the colored composition and on uniformity of dye concentration within the colored composition. Also, in combination with Comparative Example 6, this example demonstrates the enhanced homogenenizing effect of low ionomer concentrations, on the order of about 1%, on the color concentrate and the second portion, as the relative difference between the resinous component and the base component decreases.

The colored composition of this example was prepared according to the method used in Example 6, but with a different composition. In this example, the colored composition included the color concentrate of Example 42 and the second portion of Example 43.

The hot melt ink was filtered through the preheated Tetko screen as described in Example 3. No material was retained on the screen, which demonstrates that the dye was fully dissolved in the hot melt ink. The Brookfield viscosity of the hot melt ink was determined to be 24.3 centipoise at 125° C. using the No. 18 spindle. Also, the melting point of the colored composition was determined to be 77° C. The composition of the hot melt ink of this example is presented in the following table:

TABLE 48

| Ingredients | Parts by Weight |
| --- | --- |
| Azamide ® 2462 polyamide resin | 10.0 |
| Versamid ® 759 polyamide resin | 20.0 |
| Aclyn ® 293 ionomer | 1.0 |
| Irganox ® 1010 antioxidant | 0.5 |
| BHA | 0.5 |
| A-C ® 540 ethylene acrylic acid copolymer | 2.0 |
| Orasol ® Yellow 4GN | 2.0 |
| Kemamide ®.S stearamide | 12.0 |
| Kemamide ® S-180 stearyl stearamide | 40.0 |
| Polywax ® 500 polyethylene wax | 10.0 |
| Tinuvin ® 328 substituted benzotriazole | 2.0 |
| Tinuvin ® 144 hindered amine additive | 1.0 |

In the cooled and solidified hot melt ink of this example, the Orasol® Yellow 4GN dye was uniformly distributed between the second portion and the color concentrate. Additionally, the second portion and the color concentrate were substantially compatible with each other. A major layer of deep and uniform blue color was observed in the solidified hot melt ink, as compared to the two distinct layers of Comparative Example 6. Only minor non-compatibility of the second portion and the color concentrate was observed. Specifically, the periphery of the meniscus formed on solidification of the hot melt ink of this example in the mold had a small area with a light cyan color, as compared to the deep and uniform color observed in the major layer. The volume of the ink with the light cyan color was substantially less than 1% of the total ink volume.

The enhanced color uniformity and enhanced compatibility of the color concentrate and the second portion occurred, as compared to Comparative Example 6, occurred even though the same ionomer with the same concentration was used in this example and in Comparative Example 6. Additionally, the resinous component of this example had the same composition and concentration as in Comparative Example 6. However, the relative difference in polarity between the resinous component and the base component was significantly smaller in the ink of this Example, as compared to the ink of Comparative Example 6, since the percentage of non-polar Polywax® 500 polyethylene wax was diminished by substituting fatty amides with increased polarity, relative to the Polywax® 500 polyethylene wax. It is believed that the decreased difference in relative polarity between the resinous component and the base component of this example enhanced the ability of the ionomer to couple the base component and the resinous component, thereby enhancing the color uniformity and the compatibility of the second portion and the color concentrate.

Samples of the hot melt ink were used in a large format ink jet printer, namely the Lasermaster DisplayMaker ExPress printing unit, to print dots on various substrates, including a sheet of clear and transparent polymeric material, a sheet of white and transparent material, and a sheet of white paper coated with clear and transparent polymeric material. The colored composition exhibited good jetability in the ink jet printer and resulted in no clogging whatsoever in the ink jet nozzle while printing the dots on the various printed substrates. The dots exhibited strong color intensity and good dot circularity, since the dots were of uniform circular shape when viewed under the Olympus SZH 10 microscope.

Each of the printed substrates were heated to about 90° C. for about 10 seconds with a conventional hair dryer to flatten and spread the dots in accordance with the method of the present invention and form uniform solid print regions. Each of these solid print regions exhibited strong intensity yellow images and, when manually rubbed by hand, exhibited good adhesion and smear resistance.

After heating the printed substrates, the reflectance spectra for the colored composition of this example, as printed on the various substrates, was evaluated using the X-Rite 938 spectrodensitometer. The reflectance spectra for the colored composition that was printed on the clear and transparent polymeric material are as follows: $L^*=86.66$; $a^*=-11.45$; $b^*=89.70$; $C^*_{ab}=90.43$; $h_{ab}=97.28$. Additionally, the optical density of the colored composition that was printed on the clear and transparent polymeric material was measured, using the Gretag Model No. D182 densitometer, to be 1.0. The reflectance spectra for the colored composition that was printed on the white and transparent polymeric material are as follows: $L^*=87.91$; $a^*=-7.84$; $b^*=93.78$; $C^*_{ab}=94.11$; $h_{ab}=94.78$. The reflectance spectra for the colored composition that was printed on the white paper coated with clear and transparent polymeric material are as follows: $L^*=89.53$; $a^*=-8.31$; $b^*=96.32$; $C^*_{ab}=97.17$; $h_{ab}=94.91$. For the clear and transparent polymeric material, the white and transparent polymeric material, and the white paper coated with clear and transparent polymeric material, the thickness of the colored composition where the reflectance spectra and optical density were measured was about 20 microns.

EXAMPLE 45

This example demonstrates preparation of the color concentrate according to the method used in Example 4, except with a different composition than used in Example 4. In this example, the resinous component of the color concentrate included the 10.0 parts of the Azamide® 2462 polyamide and 20.0 parts of the Versamid® 759 polyamide resin. The color concentrate also included 1.0 part of the Aclyn® 293 ionomer, 0.5 parts of the Irganox® 1010 antioxidant, and 1.5 parts of the A-C® 540 ethylene acrylic acid copolymer. The colorant consisted of 1.5 parts of Orasol® Pink 5BLG dye. The composition of the color concentrate of this example is summarized in the following table:

TABLE 49

| Ingredients | Parts by Weight |
| --- | --- |
| Azamide ® 2462 polyamide resin | 10.0 |
| Versamid ® 759 polyamide resin | 20.0 |
| Aclyn ® 293 ionomer | 1.0 |
| Irganox ® 1010 antioxidant | 0.5 |
| A-C ® 540 ethylene acrylic acid copolymer | 1.5 |
| Orasol ® Pink 5BLG | 1.5 |

EXAMPLE 46

This example demonstrates preparation of the colored composition according to the method used in Example 6. In this example, the colored composition consisted of the color concentrate of Example 45 and the second portion of Example 43.

The hot melt ink was filtered through the preheated Tetko screen as described in Example 3. No material was retained on the screen, which demonstrates that the dye was fully dissolved in the hot melt ink. The Brookfield viscosity of the hot melt ink was determined to be 20.9 centipoise at 125° C. using the No. 18 spindle. Also, the melting point of the colored composition was determined to be 78° C. The composition of the hot melt ink of this example is presented in the following table:

TABLE 50

| Ingredients | Parts by Weight |
| --- | --- |
| Azamide ® 2462 polyamide resin | 10.0 |
| Versamid ® 759 polyamide resin | 20.0 |
| Aclyn ® 293 ionomer | 1.0 |
| Irganox ® 1010 antioxidant | 0.5 |
| A-C ® 540 ethylene acrylic acid copolymer | 1.5 |
| Orasol ® Pink 5BLG dye | 1.5 |
| Kemamide ® S stearamide | 12.0 |
| Kemamide ® S-180 stearyl stearamide | 40.0 |
| Polywax ® 500 polyethylene wax | 10.0 |
| Tinuvin ® 328 substituted benzotriazole | 2.0 |
| Tinuvin ® 144 hindered amine additive | 1.0 |

Samples of the hot melt ink were used in a large format ink jet printer, namely the Lasermaster DisplayMaker ExPress printing unit, to print dots on various substrates, including a sheet of clear and transparent polymeric material, a sheet of white and transparent polymeric material, and a sheet of white paper coated with clear and transparent polymeric material. The colored composition exhibited good jetability in the ink jet printer and resulted in no clogging whatsoever in the ink jet nozzle while printing the dots on the various substrates. The dots exhibited strong color intensity and good dot circularity, since the dots were of uniform circular shape when viewed under the Olympus SZH 10 microscope.

Each of the printed substrates were heated to about 90° C. for about 10 seconds with a conventional hair dryer to flatten and spread the dots in accordance with the method of the present invention and form uniform solid print regions. Each of these solid print regions exhibited strong intensity pink images and, when manually rubbed by hand, exhibited good adhesion and smear resistance.

After the heating the printed substrates, the reflectance spectra for the colored composition of this example, as printed on the various substrates, was evaluated using the X-Rite 938 spectrodensitometer. The reflectance spectra for the colored composition that was printed on the sheet of clear and transparent polymeric material are as follows: $L^*=45.71$; $a^*=71.16$; $b^*=-14.59$; $C^*_{ab}=72.65$; $h_{ab}=348.41$. Additionally, the optical density of the colored composition was measured using the Gretag Model No. D182 densitometer to be 1.64. For the sheet of clear and transparent polymeric material, the thickness of the colored composition where the reflectance spectra and optical density were measured was about 20 microns.

EXAMPLE 47

This example demonstrates preparation of the colored composition according to the method used in Example 6 and with the composition of the hot melt ink of Example 46, except that the Orasol® Pink 5BLG dye of Example 46 was replaced with Pylakrome Dark Magenta LX 10032 dye in this example. In this example, the colored composition consisted of the second portion of Example 43 and the color concentrate of Example 45, with the Orasol® Pink 5BLG dye of Example 45 replaced with the Pylakrome Dark Magenta LX 10032 dye.

The hot melt ink was filtered through the preheated Tetko screen as described in Example 3. No material was retained on the screen, which demonstrates that the dye was fully dissolved in the hot melt ink. The Brookfield viscosity of the hot melt ink was determined to be 22.0 centipoise at 125° C. using the No. 18 spindle. Also, the melting point of the colored composition was determined to be 78° C. The composition of the hot melt ink of this example is presented in the following table:

TABLE 51

| Ingredients | Parts by Weight |
|---|---|
| Azamide ® 2462 polyamide resin | 10.0 |
| Versamid ® 759 polyamide resin | 20.0 |
| Aclyn ® 293 ionomer | 1.0 |
| Irganox ® 1010 antioxidant | 0.5 |
| A-C ® 540 ethylene acrylic acid copolymer | 1.5 |
| Pylakrome Dark Magenta LX 10032 dye | 1.5 |
| Kemamide ® S stearamide | 12.0 |
| Kemamide ® S-180 stearyl stearamide | 40.0 |
| Polywax ® 500 polyethylene wax | 10.0 |
| Tinuvin ® 328 substituted benzotriazole | 2.0 |
| Tinuvin ® 144 hindered amine additive | 1.0 |

Samples of the hot melt ink were used in a large format ink jet printer, namely the Lasermaster DisplayMaker ExPress printing unit, to print dots on various substrates, including a sheet of clear and transparent polymeric material, a sheet of white and transparent material, and a sheet of white paper coated with clear and transparent polymeric material. The colored composition exhibited good jetability in the ink jet printer and resulted in no clogging whatsoever in the ink jet nozzle while printing the dots on the various substrates. The dots exhibited strong color intensity and good dot circularity, since the dots were of uniform circular shape when viewed under the Olympus SZH10 microscope.

Each of the printed substrates were heated to about 90° C. for about 10 seconds with a conventional hair dryer to flatten and spread the dots in accordance with the method of the present invention and form uniform solid print regions. Each of these solid print regions exhibited strong intensity magenta images and, when manually rubbed by hand, exhibited good adhesion and smear resistance.

After heating the printed substrates, the reflectance spectra for the colored composition of this example, as printed on the various substrates, was evaluated using the X-Rite 938 spectrodensitometer. The reflectance spectra for the colored composition that was printed on the clear and transparent polymeric material are as follows: $L^*=66.32$; $a^*=45.02$; $b^*=-17.62$; $C^*_{ab}=48.35$; $h_{ab}=338.63$. The reflectance spectra for the colored composition that was printed on the white and transparent polymeric material are as follows: $L^*=58.24$; $a^*=57.31$; $b^*=-16.88$; $C^*_{ab}=59.75$; $h_{ab}=343.59$. The reflectance spectra for the colored composition that was printed on the white paper coated with clear and transparent polymeric material are as follows: $L^*=59.31$; $a^*=57.66$; $b^*=-16.93$; $C^*_{ab}=60.09$; $h_{ab}=343.64$. For the clear and transparent polymeric material, the white and transparent polymeric material, and the white paper coated with clear and transparent polymeric material, the thickness of the colored composition where the reflectance spectra were measured was about 20 microns.

EXAMPLE 48

This example demonstrates preparation of the color concentrate according to the method used in Example 4, except with a different composition than used in Example 4. In this example, the resinous component of the color concentrate included 10.0 parts of the Azamide® 2462 polyamide resin and 20.0 parts of the Versamid® 759 polyamide resin. Also, the color concentrate included 1.0 part of the Aclyn® 293 ionomer, 0.5 parts of the Surfynol® 104, 0.5 parts of the BHA, and 2.0 parts of the A-C® 540 ethylene acrylic acid copolymer, each of which were added at about the same time to the molten resinous component. The colorant consisted of 2.0 parts of the Orasol® Blue GN dye.

The composition of the color concentrate of this example is summarized in the following table:

TABLE 52

| Ingredients | Parts by Weight |
|---|---|
| Azamide ® 2462 polyamide resin | 10.0 |
| Versamid ® 759 polyamide resin | 20.0 |
| Aclyn ® 293 ionomer | 1.0 |
| Surfynol ® 104 2,4,7,9-tetramethyl-5-decyne-4,7-diol | 0.5 |
| BHA | 0.5 |
| A-C ® 540 ethylene acrylic acid copolymer | 2.0 |
| Orasol ® Blue GN dye | 2.0 |

EXAMPLE 49

This example demonstrates preparation of the colored composition according to the method used in Example 6, but with a different composition. In this example, the colored composition included the color concentrate of Example 48 and the second portion of Example 43.

The hot melt ink was filtered through the preheated Tetko screen as described in Example 3. No material was retained on the screen, which demonstrates that the dye was fully dissolved in the hot melt ink. The Brookfield viscosity of the hot melt ink was determined to be 27.2 centipoise at 125° C. using the No. 18 spindle. Also, the melting point of the colored composition was determined to be 77° C. The composition of the hot melt ink of this example is presented in the following table:

TABLE 53

| Ingredients | Parts by Weight |
|---|---|
| Azamide ® 2462 polyamide resin | 10.0 |
| Versamid ® 759 polyamide resin | 20.0 |
| Aclyn ® 293 ionomer | 1.0 |
| Surfynol ® 104 2,4,7,9-tetramethyl-5-decyne-4,7-diol | 0.5 |
| BHA | 0.5 |
| A-C ® 540 ethylene acrylic acid copolymer | 2.0 |
| Orasol ® Blue GN dye | 2.0 |
| Kemamide ® S stearamide | 12.0 |
| Kemamide ® S-180 stearyl stearamide | 40.0 |
| Polywax ® 500 polyethylene wax | 10.0 |
| Tinuvin ® 328 substituted benzotriazole | 2.0 |
| Tinuvin ® 144 hindered amine additive | 1.0 |

Samples of the hot melt ink were used in a large format ink jet printer, namely the Lasermaster DisplayMaker ExPress printing unit, to print dots on various substrates, including a sheet of clear and transparent polymeric material, a sheet of white and transparent material, and a sheet of white paper coated with clear and transparent polymeric material. The colored composition exhibited good jetability in the ink jet printer and resulted in no clogging whatsoever in the ink jet nozzle while printing the dots on the various substrates. The dots exhibited strong color intensity and good dot circularity, since the dots were of uniform circular shape when viewed under the Olympus SZH10 microscope.

Each of the printed substrates were heated to about 90° C. for about 10 seconds with a conventional hair dryer to flatten and spread the dots in accordance with the method of the present invention and form uniform solid print regions. Each of these solid print regions exhibited strong intensity cyan images and, when manually rubbed by hand, exhibited good adhesion and smear resistance.

After heating the printed substrates, the reflectance spectra for the colored composition of this example, as printed on the various substrates, was evaluated using the X-Rite 938 spectrodensitometer. The reflectance spectra for the colored composition that was printed on the clear and transparent polymeric material are as follows: $L^*=59.57$; $a^*=-48.39$; $b^*=-40.78$; $C^*_{ab}=63.29$; $h_{ab}=220.12$. The reflectance spectra for the colored composition that was printed on the white and transparent polymeric material are as follows: $L^*=54.15$; $a^*=-41.64$; $b^*=-46.23$; $C^*_{ab}=62.21$; $h_{ab}=228.00$. The reflectance spectra for the colored composition that was printed on the white paper coated with clear and transparent polymeric material are as follows: $L^*=54.98$; $a^*=-42.06$; $b^*=-47.47$; $C^*_{ab}=63.43$; $h_{ab}=228.48$. For the clear and transparent polymeric material, the white and transparent polymeric material, and the white paper coated with clear and transparent polymeric material, the thickness of the colored composition where the reflectance spectra were measured was about 20 microns.

Although the present invention has been described with reference to preferred embodiments, workers skilled in the art will recognize that changes may be made in form and detail without departing from the spirit and scope of the invention.

What is claimed is:

1. A color concentrate, the color concentrate comprising a dye and an ionomer.

2. The color concentrate of claim 1 wherein the ionomer is capable of enhancing the concentration of the dye in the color concentrate.

3. The color concentrate of claim 1, the color concentrate further comprising a resin.

4. The color concentrate of claim 1 and further comprising a base component, the base component combinable with the color concentrate to make an ink composition.

5. A hot melt ink concentrate, the ink concentrate comprising a colorant, a non-wax colorant blend agent, and a resin, the resin having a composition that is different from the composition of the colorant blend agent.

6. The ink concentrate of claim 5 wherein the colorant comprises a dye.

7. The ink concentrate of claim 5 wherein the colorant blend agent is capable of enhancing the solubility of the colorant in the resin.

8. The ink concentrate of claim 5 and further comprising a base component, the base component combinable with the ink concentrate to make an ink composition.

9. A color concentrate, the color concentrate comprising a colorant and a colorant blend agent, the colorant comprising a dye, the colorant blend agent comprising a metal, and the color concentrate combinable with a base component to make an ink composition with a dye concentration greater than about 10 weight percent.

10. The color concentrate of claim 9 wherein the base component comprises a wax.

11. An ink composition, the ink composition comprising:
 a wax; and
 a dye, the weight percent of the dye in the ink composition being greater than about 15%.

12. The ink composition of claim 11 wherein the concentration of the wax in the ink composition is greater than about 30 weight percent.

13. An ink composition, the ink composition comprising:
 an ionomer;
 a vehicle; and
 a colorant, with the ink composition being black in color and with the $L^*$ value of a substantially uniform thin film of the ink composition being not more than about 12.

14. The ink composition of claim 13 wherein the thickness of the thin film ranges from about 2 microns to about 40 microns.

15. An ink composition, the ink composition comprising:
 an ionomer;
 a vehicle; and
 a colorant, with the ink composition being magenta in color and with the $C^*_{ab}$ value of a substantially uniform thin film of the ink composition being greater than about 45.

16. The ink composition of claim 15 wherein the thickness of the thin film ranges from about 2 microns to about 40 microns.

17. The ink composition of claim 15 wherein the ink composition is cyan in color and the $C^*_{ab}$ value of the substantially uniform thin film of the ink composition is greater than about 50.

18. The ink composition of claim 17 wherein the thickness of the thin film ranges from about 2 microns to about 40 microns.

19. The ink composition of claim 15 wherein the ink composition is yellow in color and the $C^*_{ab}$ value of the substantially uniform thin film of the ink composition is greater than about 80.

20. The ink composition of claim 19 wherein the thickness of the thin film ranges from about 2 microns to about 40 microns.

21. An ink composition for ink jet recording on a recording medium at temperatures higher than room temperature, the ink composition comprising:
 a vehicle comprising a mixture of at least a wax and a resin;
 an effective amount of a colorant combined with the vehicle to provide sufficient optical density for recording; and
 an effective amount of a blend agent to allow the colorant to either dissolve or disperse in the vehicle and provide a stable ink composition.

22. The ink composition of claim 21 wherein the concentration of the colorant in the ink composition is greater than about 10 weight percent.

23. A hot melt composition, the hot melt composition comprising:
 a color concentrate, the color concentrate comprising:
  a colorant, and
  a colorant blend agent, the colorant blend agent comprising a metal; and
 a base component.

24. The hot melt composition of claim 23 wherein the concentration of the colorant in the hot melt composition is greater than about 10 weight percent.

25. The hot melt composition of claim 23 wherein the base component comprises a wax, the concentration of the wax in the hot melt composition being greater than about 30 weight percent.

26. An ink composition, the ink composition comprising:
 a color concentrate, the color concentrate comprising:
  a first component, and
  a colorant;
 a second component, the second component being less polar than the first component; and a blend agent, the blend agent being different from the first component and the blend agent effective to enhance color uniformity in the first and second components.

27. The ink composition of claim 26 wherein the blend agent comprises an ionomer.

28. A colorant blend agent, the colorant blend agent usable in a composition comprising a color concentrate and a first component, the color concentrate comprising a colorant and a second component, the blend agent being different from the first component, the second component being more polar than the first component, and the colorant blend agent effective to enhance color uniformity in the first and second components.

29. A method of making a hot melt ink concentrate, the method comprising combining a colorant, a non-wax colorant blend agent, and a resin, the resin having a composition that is different from the composition of the colorant blend agent.

30. The method of claim 29 wherein the concentration of the colorant is greater than about 30 weight percent.

31. The method of claim 29 wherein the colorant comprises a dye.

32. The method of claim 29 and further comprising enhancing the solubility of the colorant in the resin using the colorant blend agent.

33. The method of claim 29, the method further comprising combining the ink concentrate and a base component to make an ink composition.

34. The method of claim 33 wherein the concentration of the colorant in the ink composition is greater than about 10 weight percent.

35. A method of making a color concentrate, the method comprising combining a dye and an ionomer.

36. The method of claim 35 wherein the ionomer is capable of enhancing the concentration of the dye in the color concentrate.

37. The method of claim 35, the method further comprising combining a resin with the dye and the ionomer.

38. The method of claim 35, the method further comprising combining the color concentrate and a base component to make an ink composition.

39. A method of making an ink composition, the method comprising:
combining a color concentrate and a base component, the color concentrate comprising:
a dye and
a colorant blend agent, the colorant blend agent comprising a metal.

40. The method of claim 39 wherein the base component comprises a wax.

41. A method of making an ink composition, the method comprising:
combining a color concentrate and a base component, the color concentrate comprising a dye and a colorant blend agent, the colorant blend agent comprising a metal, the colorant blend agent capable of making the concentration of the dye in the ink composition greater than about 10 weight percent.

42. A method of making an ink composition, the method comprising:
making a color concentrate, the color concentrate comprising a first colorant blend agent; and
combining the color concentrate and an ink portion, the ink portion comprising a second colorant blend agent.

43. A method of making a hot melt composition, the method comprising mixing a color concentrate, an ionomer, and a base component, the color concentrate comprising a colorant.

44. The method of claim 43 wherein the colorant comprises a dye.

45. The method of claim 43 wherein the concentration of the colorant in the hot melt composition is greater than about 10 weight percent.

46. The method of claim 43, with the color concentrate being in the molten state at some time prior to mixing the color concentrate with the base component.

47. A method of increasing colorant concentration in a hot melt composition, the method comprising:
mixing a colorant and a resin to make a color concentrate, the resin selected from the group consisting of polyamide, polyurethane, polycarbonate, polyester, epoxy, ionomer, polyvinyl alcohol, polyol, polyvinyl chloride, polyvinylidene-based chloride, polyvinyl acetate, polyvinyl pyridine ester, polysulfonamide, polyvinyl pyrolidone/polyvinyl acetate copolymer, polyvinyl pyrolidone copolymer, p-toluene sulfonamide, dimer acid amide, tetra-amide, silicon resin, phenolic resin, rosin-modified phenolic resin, rosin-modified maleic acid resin, and a mixture of any of these; and
mixing a wax and the color concentrate.

48. The method of claim 47 wherein the colorant comprises a dye.

49. The method of claim 48 wherein the concentration of the dye in the hot melt composition is greater than about 10 weight percent.

50. The method of claim 47 wherein the colorant comprises a pigment and wherein the concentration of the pigment in the hot melt composition is greater than about 15 weight percent.

51. The method of claim 47, the method further comprising incorporating a first colorant blend agent in the color concentrate.

52. The method of claim 51, the method further comprising mixing a second colorant blend agent with the wax.

53. A method of making an ink composition, the method comprising:
combining a resinous component and a colorant to make a color concentrate, the resinous component selected from the group consisting of polyamide, polyurethane, polycarbonate, polyester, epoxy, ionomer, polyvinyl alcohol, polyol, polyvinyl chloride, polyvinylidene-based chloride, polyvinyl acetate, polyvinyl pyridine ester, polysulfonamide, polyvinyl pyrolidone/polyvinyl acetate copolymer, polyvinyl pyrolidone copolymer, p-toluene sulfonamide, dimer acid amide, tetra-amide, silicon resin, phenolic resin, rosin-modified phenolic resin, rosin-modified maleic acid resin, and a mixture of any of these; and
combining a base component and the color concentrate to make the ink composition, the base component being less polar than the resinous component and the ink composition comprising a blend agent, the blend agent effective to enhance color uniformity as between the resinous component and the base component.

54. The method of claim 53 wherein the blend agent comprises an ionomer.

55. A method of enhancing the concentration of a colorant attainable in a wax, the method comprising mixing the wax with a color concentrate, the color concentrate comprising a colorant and a resinous component, the resinous component selected from the group consisting of polyamide, polyurethane, polycarbonate, polyester, epoxy, ionomer, polyvinyl alcohol, polyol, polyvinyl chloride, polyvinylidene-based chloride, polyvinyl acetate, polyvinyl pyridine ester, polysulfonamide, polyvinyl pyrolidone/polyvinyl acetate copolymer, polyvinyl pyrolidone copolymer, p-toluene sulfonamide, dimer acid amide, tetra-amide, silicon resin, phenolic resin, rosin-modified phenolic resin, rosin-modified maleic acid resin, and a mixture of any of these.

56. The method of claim 55 wherein the colorant comprises a dye.

57. The method of claim 55 wherein the color concentrate further comprises a colorant blend agent.

58. The method of claim 55, the method further comprising mixing a colorant blend agent with the wax before combining the wax with the color concentrate.

59. A method of making an ink composition, the method comprising:

combining a vehicle, an ionomer, and a colorant, the colorant effective to make the ink composition magenta in color; and making the amount of the colorant effective to make the $C^*_{ab}$ value of a substantially uniform thin film of the ink composition greater than about 45.

60. The method of claim 59 wherein the thin film has a thickness of from about 2 microns to about 40 microns.

61. The method of claim 59 wherein the colorant is effective to make the ink composition cyan in color and the amount of the colorant is effective to make the $C^*_{ab}$ value of the substantially uniform thin film of the ink composition greater than about 50.

62. The method of claim 61 wherein the thin film has a thickness of from about 2 microns to about 40 microns.

63. The ink composition of claim 59 wherein the colorant is effective to make the ink composition yellow in color and the amount of the colorant is effective to make the $C^*_{ab}$ value of the substantially uniform thin film of the ink composition is greater than about 80.

64. The method of claim 63 wherein the thin film has a thickness of from about 2 microns to about 40 microns.

65. A method of making an ink composition, the method comprising:

combining a vehicle, an ionomer, and a colorant, the colorant effective to make the ink composition black in color; and making the amount of the colorant effective to make the $L^*$ value of a substantially uniform thin film of the ink composition not more than about 12.

* * * * *

UNITED STATES PATENT AND TRADEMARK OFFICE
CERTIFICATE OF CORRECTION

PATENT NO. : 5,574,078
DATED : NOVEMBER 12, 1996
INVENTOR(S) : HAMDY A. ELWAKIL

It is certified that error appears in the above-indentified patent and that said Letters Patent is hereby corrected as shown below:

Col. 6, line 29, delete "diphenyhnethane", insert --diphenylmethane--

Col. 6, line 67, delete "Knowlos", insert --Knowles--

Col. 17, line 39, delete "-", in front of "functional"

Col. 19, line 64, delete "$C^*_{a,b}$", insert --$C^*_{ab}$--

Col. 23, line 64, delete "-", between "exhibits" and "excellent"

Col. 28, line 52, insert --,--, after "resins"

Col. 31, lines 34-35, underline "before taking into account undissolved dye"

Col. 33, line 18, in Table 8, delete "552", insert --S-552--

Col. 38, lines 14 and 15, underline "before taking into account undissolved dye"

Col. 38, lines 58 and 59, underline "before taking into account undissolved dye"

Col. 41, lines 7-8, underline "not accounting for precipitated Orasol® Black RLI dye"

Col. 43, line 9, underline "before accounting for precipitation of the dye"

UNITED STATES PATENT AND TRADEMARK OFFICE
CERTIFICATE OF CORRECTION

PATENT NO. : 5,574,078
DATED : NOVEMBER 12, 1996
INVENTOR(S) : HAMDY A. ELWAKIL

It is certified that error appears in the above-indentified patent and that said Letters Patent is hereby corrected as shown below:

Col. 44, line 35, delete "pan", insert --part--

Col. 45, line 67, delete "stone", insert --same--

Signed and Sealed this

First Day of April, 1997

Attest:

BRUCE LEHMAN

Attesting Officer

Commissioner of Patents and Trademarks